United States Patent
Kim et al.

(10) Patent No.: US 12,464,541 B2
(45) Date of Patent: Nov. 4, 2025

(54) METHOD AND DEVICE FOR TRANSMITTING SIGNAL IN WIRELESS COMMUNICATION SYSTEM

(71) Applicant: LG ELECTRONICS INC., Seoul (KR)

(72) Inventors: Hyunmin Kim, Seoul (KR); Young Dae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 308 days.

(21) Appl. No.: 17/924,099

(22) PCT Filed: May 7, 2021

(86) PCT No.: PCT/KR2021/005757
§ 371 (c)(1),
(2) Date: Nov. 8, 2022

(87) PCT Pub. No.: WO2021/255418
PCT Pub. Date: Nov. 11, 2021

(65) Prior Publication Data
US 2023/0180264 A1    Jun. 8, 2023

(30) Foreign Application Priority Data

May 8, 2020    (KR) .................. 10-2020-0055350
May 25, 2020   (KR) .................. 10-2020-0062486

(51) Int. Cl.
*H04W 72/25*    (2023.01)
*H04W 4/46*     (2018.01)
*H04W 72/1263*  (2023.01)

(52) U.S. Cl.
CPC ............ *H04W 72/25* (2023.01); *H04W 4/46* (2018.02); *H04W 72/1263* (2013.01)

(58) Field of Classification Search
CPC ...... G08G 1/22; H04B 7/0695; H04L 5/0094; H04W 4/40; H04W 4/46; H04W 72/1263; H04W 72/25
See application file for complete search history.

(56) References Cited

U.S. PATENT DOCUMENTS

2018/0098322 A1   4/2018   Yoon
2019/0124490 A1   4/2019   Wu et al.

FOREIGN PATENT DOCUMENTS

| WO | 2018/218098 A1 | 11/2018 |
| WO | 2019/199146 A1 | 10/2019 |
| WO | 2020/093074 A2 | 5/2020 |

OTHER PUBLICATIONS

Keith Shaw, What is beamforming and how does it make wireless better? Networkworld, Mar. 14, 2022, online <https://www.networkworld.com/article/967954/beamforming-explained-how-it-makes-wireless-communication-faster.html> (Year: 2022).*

(Continued)

*Primary Examiner* — Nader Bolourchi
(74) *Attorney, Agent, or Firm* — BRYAN CAVE LEIGHTON PAISNER LLP

(57) ABSTRACT

The present disclosure relates to a method for operating a first terminal in a wireless communication system, wherein the first terminal may transmit a beam scheduling request message to a second terminal. The beam scheduling request message includes transmission beam direction information of the first terminal and receiving beam schedule information of the first terminal. In addition, the first terminal may receive a beam scheduling confirm message from the second terminal. The beam scheduling confirm message includes transmission beam direction information of the second terminal and receiving beam schedule information of the second terminal. In addition, the first terminal may transmit (Continued)

data to the second terminal based on the beam scheduling confirm message.

18 Claims, 32 Drawing Sheets

(56) References Cited

OTHER PUBLICATIONS

Beamforming, Wikipedia, online <https://en.wikipedia.org/wiki/Beamforming> (Year: 2025).*
What Is Beamforming? Huawei, online <https://info.support.huawei.com/info-finder/encyclopedia/en/Beamforming.html> (Year: 2025).*
Chiradeep BasuMallick, What Is Beamforming? Working, Techniques, and Uses, Spiceworks, Oct. 6, 2022, online <https://www.spiceworks.com/tech/networking/articles/what-is-beamforming-working/> (Year: 2022).*
[5] Types of Beamforming in Wireless Communication, GeeksandGeeks, May 15, 2023, Online <https://www.geeksforgeeks.org/types-of-beamforming-in-wireless-communication/> (Year: 2023).*

* cited by examiner

METHOD AND DEVICE FOR TRANSMITTING SIGNAL IN WIRELESS COMMUNICATION SYSTEM

CROSS REFERENCE TO RELATED APPLICATIONS

This application is the National Stage filing under 35 U.S.C. 371 of International Application No. PCT/KR2021/005757, filed on May 7, 2021, which claims the benefit of and priority to Korean Application No. 10-2020-0055350, filed on May 8, 2020 and Korean Application No. 10-2020-0062486, filed on May 25, 2020, the contents of which are all hereby incorporated by reference herein in their entirety.

TECHNICAL FIELD

The present disclosure relates to a wireless communication system and, more particularly, to a method and apparatus for efficiently allocating a resource in a wireless communication system.

BACKGROUND

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

The present disclosure relates to a method and apparatus for efficiently allocating a resource in a wireless communication system.

The present disclosure relates to a method and apparatus for reducing interference between platoon groups in a wireless communication system.

The technical objects to be achieved in the present disclosure are not limited to the above-mentioned technical objects, and other technical objects that are not mentioned may be considered by those skilled in the art through the embodiments described below.

As an example of the present disclosure, a method for operating a first terminal may include transmitting, by the first terminal, a beam scheduling request message to a second terminal. The beam scheduling request message includes transmission beam direction information of the first terminal and receiving beam schedule information of the first terminal, and the receiving beam schedule information of the first terminal may include at least one of receiving beam timing information of the first terminal and receiving resource pool information of the first terminal. In addition, the method may include receiving, by the first terminal, a beam scheduling confirm message from the second terminal. The beam scheduling confirm message includes transmission beam direction information of the second terminal and receiving beam schedule information of the second terminal, and the receiving beam schedule information of the second terminal may include at least one of receiving beam timing information of the second terminal and receiving resource pool information of the second terminal. In addition, the method may include transmitting, by the first terminal, data to the second terminal based on the beam scheduling confirm message.

As an example of the present disclosure, a first terminal may include a transceiver and a processor coupled with the transceiver. The processor may control the transceiver to transmit a beam scheduling request message to a second terminal. The beam scheduling request message includes transmission beam direction information of the first terminal and receiving beam schedule information of the first terminal, and the receiving beam schedule information of the first terminal may include at least one of receiving beam timing information of the first terminal and receiving resource pool information of the first terminal. In addition, the processor may control the transceiver to receive a beam scheduling confirm message from the second terminal. The beam scheduling confirm message includes transmission beam direction information of the second terminal and receiving beam schedule information of the second terminal, and the receiving beam schedule information of the second terminal may include at least one of receiving beam timing information of the second terminal and receiving resource pool information of the second terminal. In addition, the processor may control the transceiver to transmit data to the second terminal based on the beam scheduling confirm message.

As an example of the present disclosure, receiving by a second terminal a beam scheduling request message from a first terminal may be included. The beam scheduling request message includes transmission beam direction information of the first terminal and receiving beam schedule information of the first terminal, and the receiving beam schedule information of the first terminal may include at least one of receiving beam timing information of the first terminal and receiving resource pool information of the first terminal. In addition, transmitting by the second terminal a beam scheduling confirm message to the first terminal may be included. The beam scheduling confirm message includes transmission beam direction information of the second terminal and receiving beam schedule information of the second terminal, and the receiving beam schedule information of the second terminal may include at least one of receiving beam timing information of the second terminal and receiving resource pool information of the second terminal. Receiving by the second terminal data from the first terminal based on the beam scheduling confirm message may be included.

As an example of the present disclosure, a second terminal may include a transceiver and a processor coupled with the transceiver. The processor may control the transceiver to receive a beam scheduling request message from a first terminal. The beam scheduling request message includes transmission beam direction information of the first terminal and receiving beam schedule information of the first terminal, and the receiving beam schedule information of the first terminal may include at least one of receiving beam timing information of the first terminal and receiving resource pool information of the first terminal. In addition, the processor may control the transceiver to transmit a beam scheduling confirm message to the first terminal. The beam scheduling confirm message includes transmission beam direction information of the second terminal and receiving beam schedule information of the second terminal, and the receiving beam schedule information of the second terminal may include at least one of receiving beam timing information of the second terminal and receiving resource pool information of the second terminal. In addition, the processor may control the transceiver to receive data from the first terminal based on the beam scheduling confirm message.

As an example of the present disclosure, a first device may include at least one memory and at least one processor functionally coupled with the at least one memory. The at least one processor may control the first device to transmit a beam scheduling request message to a second device. The beam scheduling request message includes transmission beam direction information of the first device and receiving beam schedule information of the first device, and the receiving beam schedule information of the first device may include at least one of receiving beam timing information of the first device and receiving resource pool information of the first device. In addition, the at least one processor controls the first device to receive a beam scheduling confirm message from the second device, the beam scheduling confirm message includes transmission beam direction information of the second device and receiving beam schedule information of the second device, and the receiving beam schedule information of the second device may include at least one of receiving beam timing information of the second device and receiving resource pool information of the second device. In addition, the at least one processor may control the first device to transmit data to the second device based on the beam scheduling confirm message.

In an embodiment of the present disclosure, a non-transitory computer-readable medium storing at least one instruction may include the at least one instruction that is executable by a processor. The at least one instruction may instruct the computer-readable medium to transmit a beam scheduling request message to a terminal. The beam scheduling request message includes transmission beam direction information of the computer-readable medium and receiving beam schedule information of the computer-readable medium, and the receiving beam schedule information of the computer-readable medium may include at least one of receiving beam timing information of the computer-readable medium and receiving resource pool information of the computer-readable medium. In addition, the at least one instruction may instruct the computer-readable medium to receive a beam scheduling confirm message. The beam scheduling confirm message includes transmission beam direction information of the terminal and receiving beam schedule information of the terminal, and the receiving beam schedule information of the terminal may include at least one of receiving beam timing information of the terminal and receiving resource pool information of the terminal. In addition, the at least one instruction may instruct the computer-readable medium to transmit data to the terminal based on the beam scheduling confirm message.

The above-described aspects of the present disclosure are only a part of the preferred embodiments of the present disclosure, and various embodiments reflecting technical features of the present disclosure may be derived and understood by those skilled in the art on the basis of the detailed description of the present disclosure provided below.

The following effects may be produced by embodiments based on the present disclosure.

According to the present disclosure, a terminal may efficiently allocate a resource.

According to the present disclosure, interference may be reduced in communication between leader nodes of a platoon group.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DETAILED DESCRIPTION

Figure 1:
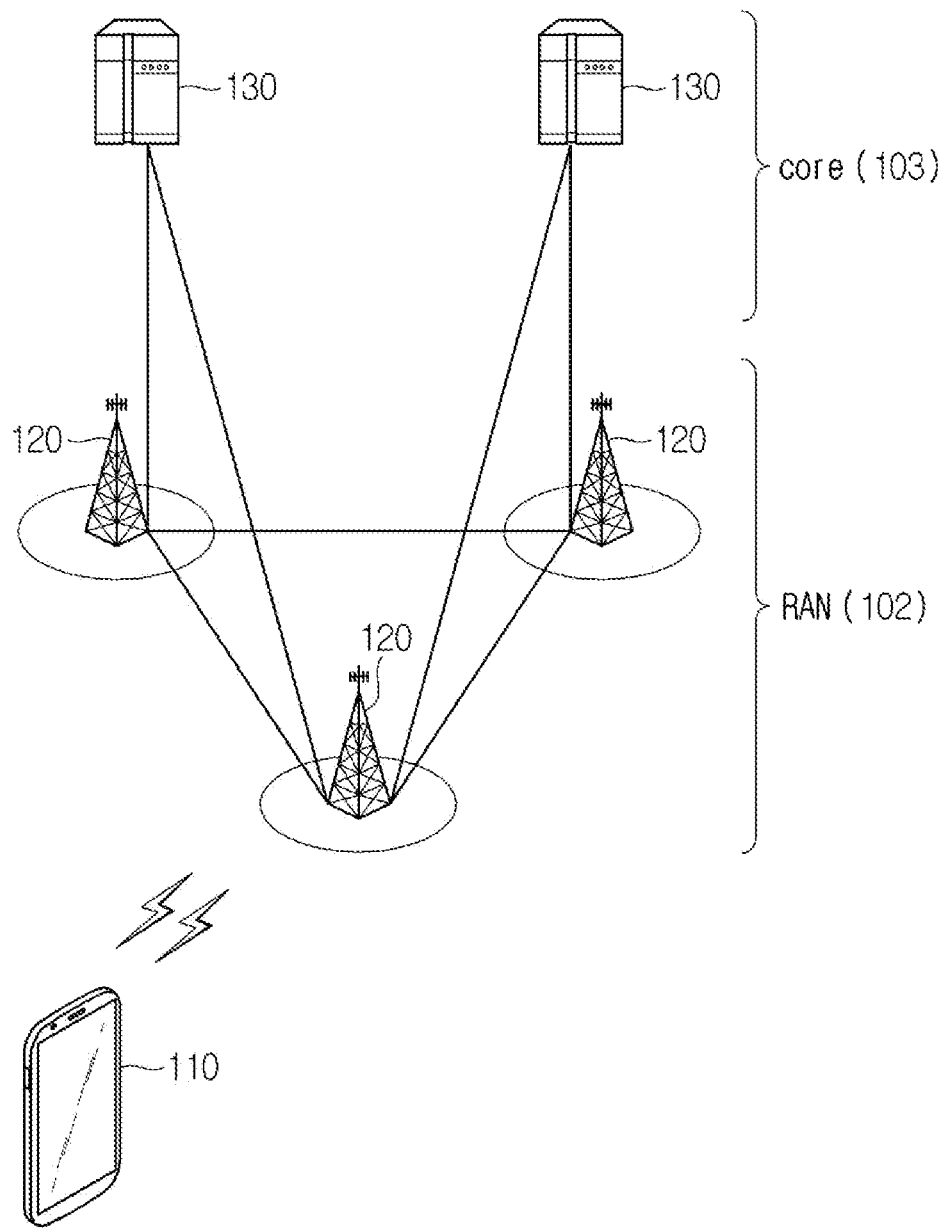
FIG. 1 illustrates a structure of a wireless communication system according to an embodiment of the present disclosure.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the drawings, procedures or steps which render the scope of the present disclosure unnecessarily ambiguous will be omitted and procedures or steps which can be understood by those skilled in the art will be omitted.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present specification may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed. For example, the following document may be referred to.

(1) 3GPP LTE
  3GPP TS 36.211: Physical channels and modulation
  3GPP TS 36.212: Multiplexing and channel coding
  3GPP TS 36.213: Physical layer procedures
  3GPP TS 36.214: Physical layer; Measurements
  3GPP TS 36.300: Overall description
  3GPP TS 36.304: User Equipment (UE) procedures in idle mode
  3GPP TS 36.314: Layer 2—Measurements
  3GPP TS 36.321: Medium Access Control (MAC) protocol
  3GPP TS 36.322: Radio Link Control (RLC) protocol
  3GPP TS 36.323: Packet Data Convergence Protocol (PDCP)
  3GPP TS 36.331: Radio Resource Control (RRC) protocol (2) 3GPP NR (e.g. 5G)
  3GPP TS 38.211: Physical channels and modulation
  3GPP TS 38.212: Multiplexing and channel coding
  3GPP TS 38.213: Physical layer procedures for control
  3GPP TS 38.214: Physical layer procedures for data
  3GPP TS 38.215: Physical layer measurements
  3GPP TS 38.300: Overall description
  3GPP TS 38.304: User Equipment (UE) procedures in idle mode and in RRC inactive state
  3GPP TS 38.321: Medium Access Control (MAC) protocol
  3GPP TS 38.322: Radio Link Control (RLC) protocol
  3GPP TS 38.323: Packet Data Convergence Protocol (PDCP)
  3GPP TS 38.331: Radio Resource Control (RRC) protocol
  3GPP TS 37.324: Service Data Adaptation Protocol (SDAP)
  3GPP TS 37.340: Multi-connectivity; Overall description Communication System Applicable to the Present Disclosure FIG. 1 illustrates a structure of a wireless communication system according to an embodiment of the present disclosure. The embodiment of FIG. 1 may be combined with various embodiments of the present disclosure.

Referring to FIG. 1, a wireless communication system includes a radio access network (RAN) 102 and a core network 103. The radio access network 102 includes a base station 120 that provides a control plane and a user plane to a terminal 110. The terminal 110 may be fixed or mobile, and may be called other terms such as a user equipment (UE), a mobile station (MS), a subscriber station (SS), a mobile subscriber station (MSS), a mobile terminal, an advanced mobile station (AMS), or a wireless device. The base station 120 refers to a node that provides a radio access service to the terminal 110, and may be called other terms such as a fixed station, a Node B, an eNB (eNode B), a gNB (gNode B), an ng-eNB, an advanced base station (ABS), an access point, a base transceiver system (BTS), or an access point (AP). The core network 103 includes a core network entity 130. The core network entity 130 may be defined in various ways according to functions, and may be called other terms such as a core network node, a network node, or a network equipment.

Components of a system may be referred to differently according to an applied system standard. In the case of the LTE or LTE-A standard, the radio access network 102 may be referred to as an Evolved-UMTS Terrestrial Radio Access Network (E-UTRAN), and the core network 103 may be referred to as an evolved packet core (EPC). In this case, the core network 103 includes a Mobility Management Entity (MME), a Serving Gateway (S-GW), and a packet data network-gateway (P-GW). The MME has access information of the terminal or information on the capability of the terminal, and this information is mainly used for mobility management of the terminal. The S-GW is a gateway having an E-UTRAN as an endpoint, and the P-GW is a gateway having a packet data network (PDN) as an endpoint.

In the case of the 5G NR standard, the radio access network 102 may be referred to as an NG-RAN, and the core network 103 may be referred to as a 5GC (5G core). In this case, the core network 103 includes an access and mobility management function (AMF), a user plane function (UPF), and a session management function (SMF). The AMF provides a function for access and mobility management in units of terminals, the UPF performs a function of mutually transmitting data units between an upper data network and the radio access network 102, and the SMF provides a session management function.

The BSs 120 may be connected to one another via Xn interface. The BS 120 may be connected to one another via core network 103 and NG interface. More specifically, the BSs 130 may be connected to an access and mobility management function (AMF) via NG-C interface, and may be connected to a user plane function (UPF) via NG-U interface.

Figure 2:
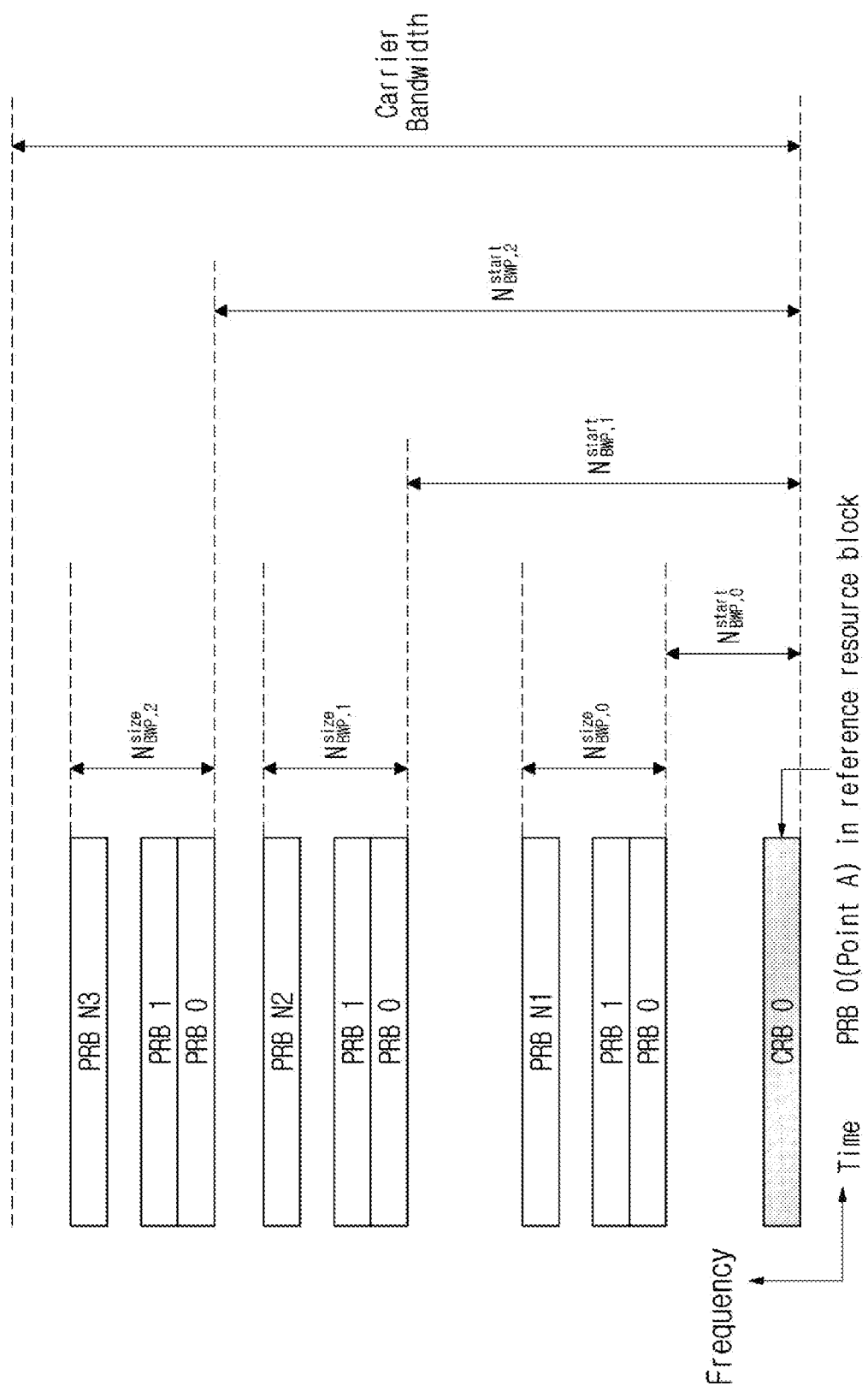
FIG. 2 illustrates an example of BWP according to an embodiment of the present disclosure.

FIG. 2 illustrates an example of a BWP applicable to the present disclosure. The embodiment of FIG. 2 may be combined with various embodiments of the present disclosure. It is assumed in the embodiment of FIG. 2 that the number of BWPs is 3.

Referring to FIG. 2, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset (NstartBWP) from the point A, and a bandwidth (NsizeBWP). For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

V2X or Sidelink Communication

Figure 3A:
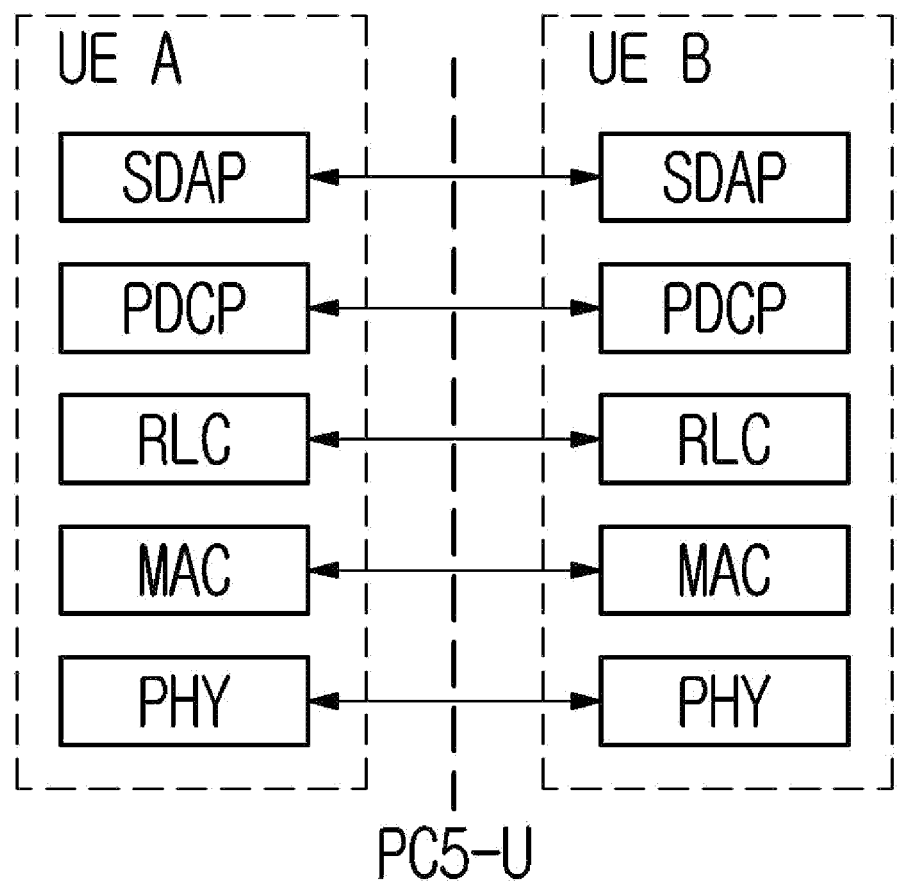
FIG. 3A and FIG. 3B illustrate a radio protocol architecture for SL communication according to an embodiment of the present disclosure.
Figure 3B:
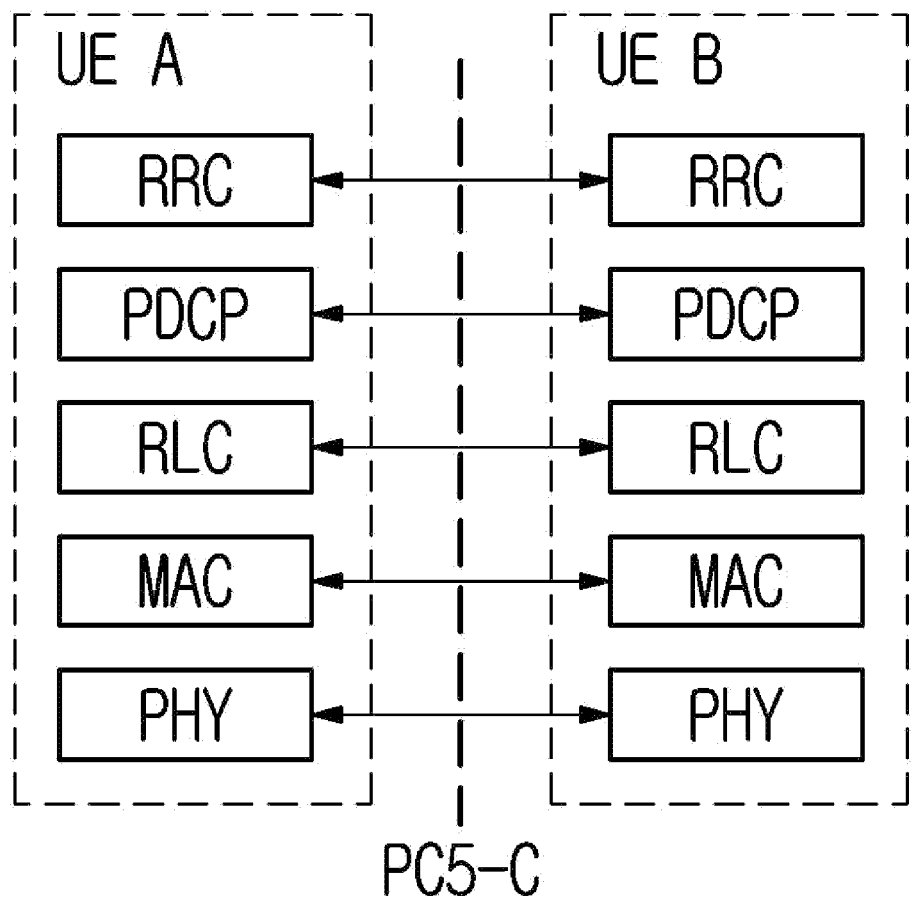

FIGS. 3A and 3B illustrate a radio protocol architecture for a SL communication applicable to the present disclosure. The embodiment of FIGS. 3A and 3B may be combined with various embodiments of the present disclosure. More specifically, FIG. 3A exemplifies a user plane protocol stack, and FIG. 3B exemplifies a control plane protocol stack.

Sidelink Synchronization Signal (SLSS) and Synchronization Information

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/receiving. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

For example, based on Table 1, the UE may generate an S-SS/PSBCH block (i.e., S-SSB), and the UE may transmit the S-SS/PSBCH block (i.e., S-SSB) by mapping it on a physical resource.

TABLE 1

■ Time-frequency structure of an S-SS/PSBCH block
In the time domain, an S-SS/PSBCH block consists of $N_{symb}^{S-SSB}$ OFDM symbols, numbered in increasing order from 0 to $N_{symb}^{S-SSB} - 1$ within the S-SS/PSBCH block, where S-PSS, S-SSS, and PSBCH with associated DM-RS are mapped to symbols as given by Table 8.4.3.1-1. The number of OFDM symbols in an S-SS/PSBCH block $N_{symb}^{S-SSB} = 13$ for normal cyclic prefix and $N_{symb}^{S-SSB} = 11$ for extended cyclic prefix. The first OFDM symbol in an S-SS/PSBCH block is the first OFDM symbol in the slot.
In the frequency domain, an S-SS/PSBCH block consists of 132 contiguous subcarriers with the subcarriers numbered in increasing order from 0 to 131 within the sidelink S-SS/PSBCH block. The quantities k and l represent the frequency and time indices, respectively, within one sidelink S-SS/PSBCH block.

TABLE 1-continued

For an S-SS/PSBCH block, the UE shall use
- antenna port 4000 for transmission of S-PSS, S-SSS, PSBCH and DM-RS for PSBCH;
- the same cyclic prefix length and subcarrier spacing for the S-PSS, S-SSS, PSBCH and DM-RS for PSBCH, Table 8.4.3.1-1: Resources within an S-SS/PSBCH block for S-PSS, S-SSS, PSBCH, and DM-RS.

| Channel or signal | OFDM symbol number l relative to the start of an S-SS/PSBCH block | Subcarrier number k relative to the start of an S-SS/PSBCH block |
|---|---|---|
| S-PSS | 1, 2 | 2, 3, . . . , 127, 128 |
| S-SSS | 3, 4 | 2, 3, . . . , 127, 128 |
| Set to zero | 1, 2, 3, 4 | 0, 1, 129, 130, 131 |
| PSBCH | 0, 5, 6, . . . , $N_{symb}^{S-SSB} - 1$ | 0, 1, . . . , 131 |
| DM-RS for PSBCH | 0, 5, 6, . . . , $N_{symb}^{S-SSB} - 1$ | 0, 4, 8, . . . , 128 |

Synchronization Acquisition of SL Terminal

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Figure 4:
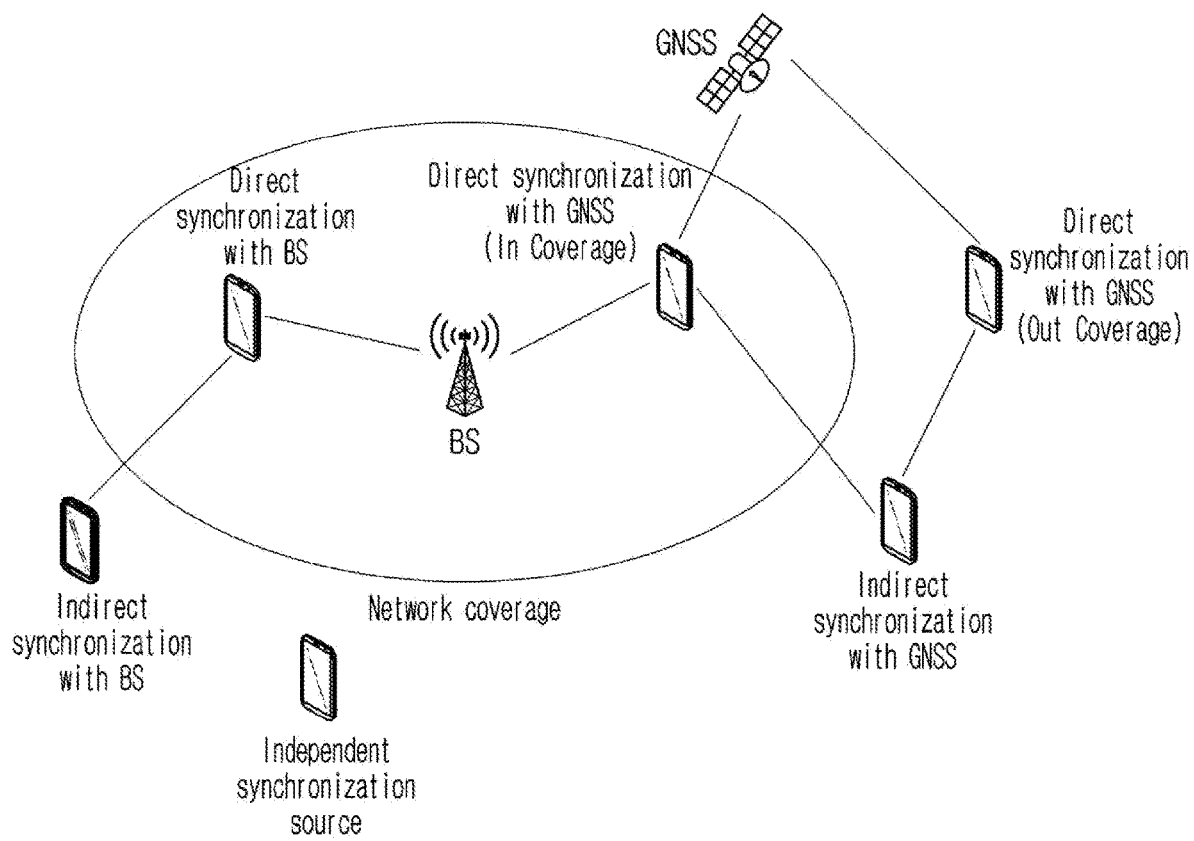
FIG. 4 illustrates a synchronization source or a synchronization reference of V2X according to an embodiment of the present disclosure.

FIG. 4 illustrates a synchronization source or synchronization reference of V2X applicable to the present disclosure. The embodiment of FIG. 4 may be combined with various embodiments of the present disclosure.

Referring to FIG. 4, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or SL communication. In this case, the UE may follow the synchronization configuration received from the BS. When the UE fails in detecting any cell in the carrier used for the V2X or SL communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

An SL synchronization source may be related to a synchronization priority. For example, the relationship between synchronization sources and synchronization priorities may be defined as shown in [Table 2] or [Table 3]. [Table 2] or [Table 3] is merely an example, and the relationship between synchronization sources and synchronization priorities may be defined in various manners.

TABLE 2

| Priority Level | GNSS-based synchronization | eNB/gNB-based synchronization |
| --- | --- | --- |
| P0 | GNSS | eNB/gNB |
| P1 | All UEs synchronized directly with GNSS | All UEs synchronized directly with NB/gNB |
| P2 | All UEs synchronized indirectly with GNSS | All UEs synchronized indirectly with eNB/gNB |
| P3 | All other UEs | GNSS |
| P4 | N/A | All UEs synchronized directly with GNSS |
| P5 | N/A | All UEs synchronized indirectly with GNSS |
| P6 | N/A | All other UEs |

TABLE 3

| Priority Level | GNSS-based synchronization | eNB/gNB-based synchronization |
| --- | --- | --- |
| P0 | GNSS | eNB/gNB |
| P1 | All UEs synchronized directly with GNSS | All UEs synchronized directly with eNB/gNB |
| P2 | All UEs synchronized indirectly with GNSS | All UEs synchronized indirectly with eNB/gNB |
| P3 | eNB/gNB | GNSS |
| P4 | All UEs synchronized directly with eNB/gNB | All UEs synchronized directly with GNSS |
| P5 | All UEs synchronized indirectly with eNB/gNB | All UEs synchronized indirectly with GNSS |
| P6 | Remaining UE(s) with lower priority | Remaining UE(s) with lower priority |

In [Table 2] or [Table 3], P0 may represent a highest priority, and P6 may represent a lowest priority. In [Table 2] or [Table 3], the BS may include at least one of a gNB or an eNB.

Whether to use GNSS-based synchronization or eNB/gNB-based synchronization may be (pre)determined. In a single-carrier operation, the UE may derive its transmission timing from an available synchronization reference with the highest priority.

For example, the UE may (re)select a synchronization reference, and the UE may obtain synchronization from the synchronization reference. In addition, the UE may perform SL communication (e.g., PSCCH/PSSCH transmission/receiving, physical sidelink feedback channel (PSFCH) transmission/receiving, S-SSB transmission/receiving, reference signal transmission/receiving, etc.) based on the obtained synchronization.

FIGS. 9A and 9B illustrate a procedure of performing V2X or SL communication by a terminal based on a transmission mode applicable to the present disclosure. The embodiment of FIGS. 9A and 9B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

Figure 5A:
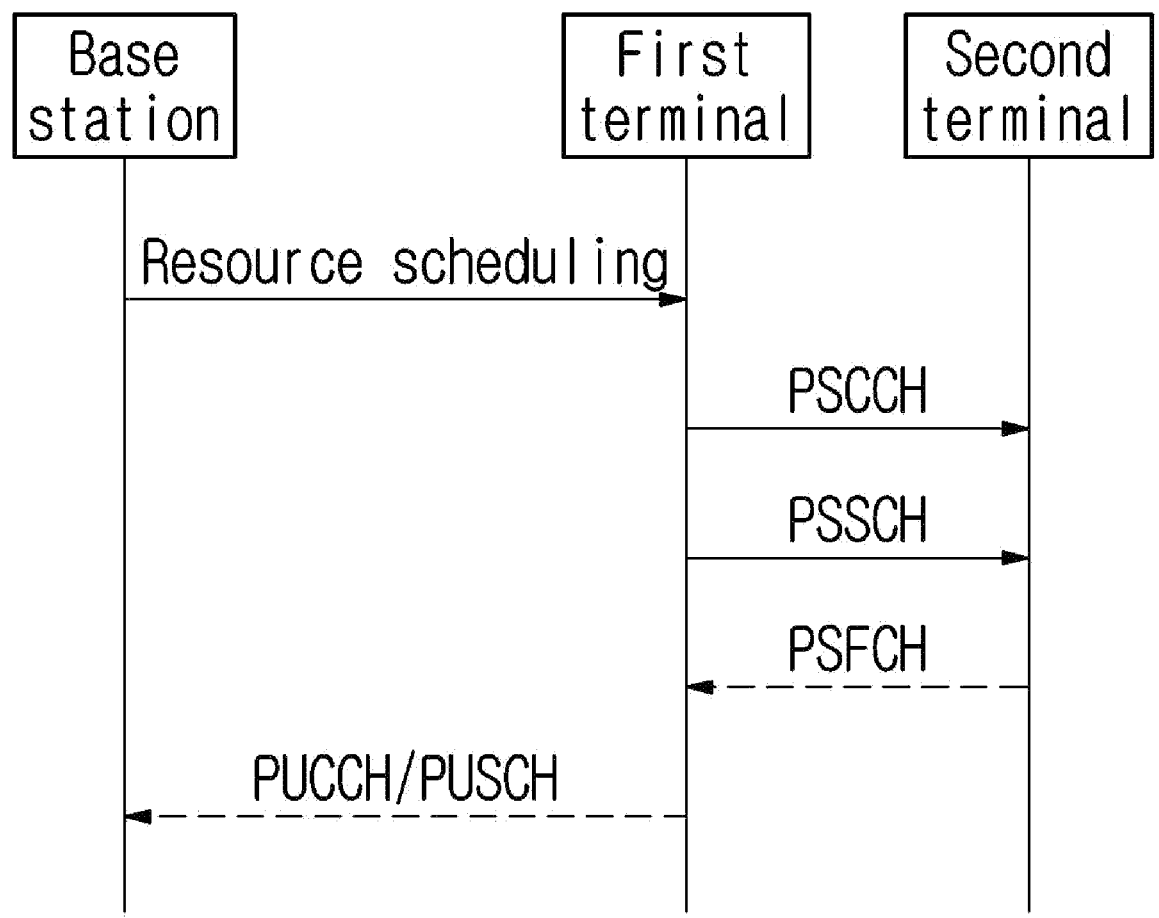
FIG. 5A and FIG. 5B illustrate a procedure in which a terminal performs V2X or SL communication according to a transmission mode, in accordance with an embodiment of the present disclosure.

For example, FIG. 5A exemplifies a UE operation related to an LTE transmission mode 1 or an LTE transmission mode 3. Alternatively, for example, FIG. 5B exemplifies a UE operation related to an NR resource allocation mode 1. For example, the LTE transmission mode 1 may be applied to general SL communication, and the LTE transmission mode 3 may be applied to V2X communication.

Figure 5B:
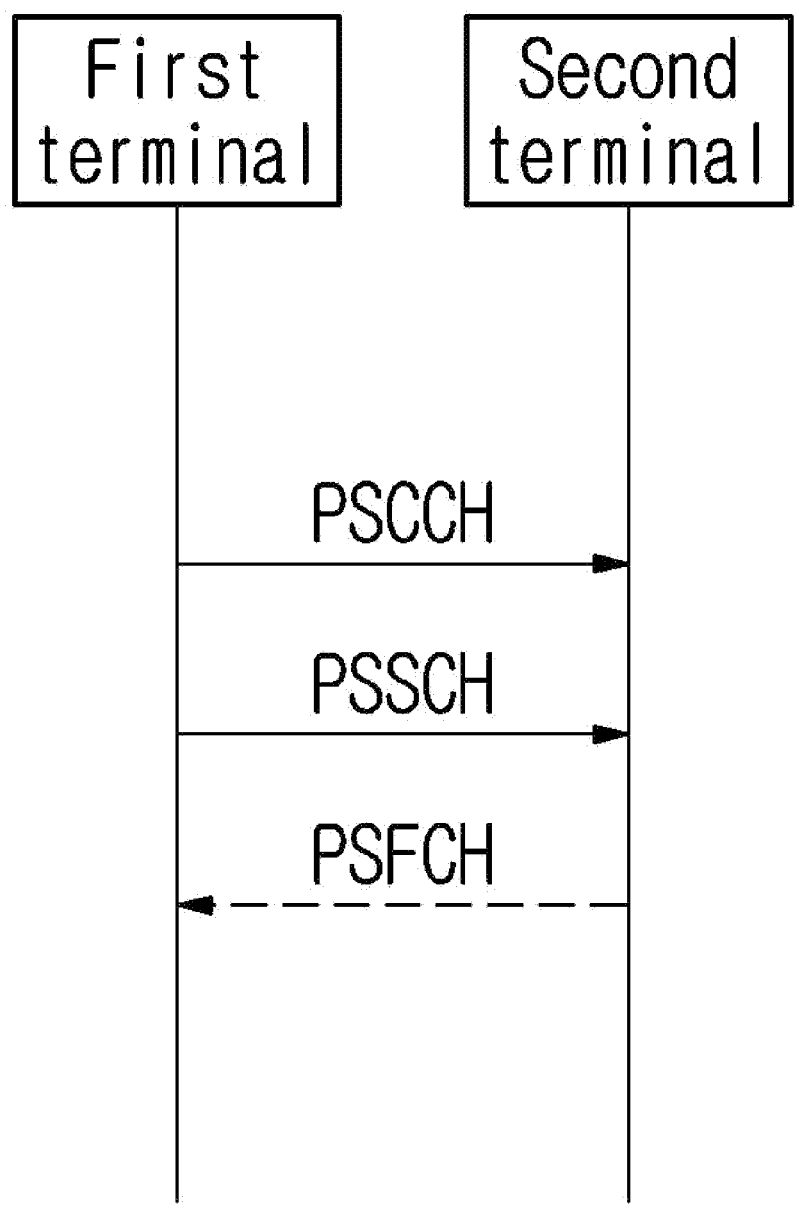

For example, FIG. 5B exemplifies a UE operation related to an LTE transmission mode 2 or an LTE transmission mode 4. Alternatively, for example, FIG. 5A exemplifies a UE operation related to an NR resource allocation mode 2.

Referring to FIG. 5A, in the LTE transmission mode 1, the LTE transmission mode 3, or the NR resource allocation mode 1, a BS may schedule an SL resource to be used by the UE for SL transmission. For example, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

Subsequently, the first UE may transmit a PSCCH (e.g., sidelink control information (SCI) or 1st-stage SCI) to a second UE based on the resource scheduling. After then, the first UE may transmit a PSSCH (e.g., 2nd-stage SCI, MAC PDU, data, etc.) related to the PSCCH to the second UE. After then, the first UE may receive a PSFCH related to the PSCCH/PSSCH from the second UE. For example, HARQ feedback information (e.g., NACK information or ACK information) may be received from the second UE through the PSFCH. After then, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1. Table 4 shows an example of a DCI for SL scheduling.

TABLE 4

3GPP TS 38.212

■ Format 3_0
DCI format 3_0 is used for scheduling of NR PSCCH and NR PSSCH in one cell.
The following information is transmitted by means of the DCI format 3_0 with CRC scrambled by
SL-RNTI or SL-CS-RNTI:
- Resource pool index -$\lceil \log_2 I \rceil$ bits, where I is the number of resource pools for
  transmission configured by the higher layer parameter sl-TxPoolScheduling.
- Time gap - 3 bits determined by higher layer parameter sl-DCI-ToSL-Trans, as defined in
  clause 8.1.2.1 of [6, TS 38.214]
- HARQ process number - 4 bits as defined in clause 16.4 of [5, TS 38.213]
- New data indicator - 1 bit as defined in clause 16.4 of [5, TS 38.213]
- Lowest index of the subchannel allocation to the initial transmission -$\lceil \log_2(N_{subChannel}^{SL}) \rceil$ bits
  as defined in clause 8.1.2.2 of [6, TS 38.214]
- SCI format 1-A fields according to clause 8.3.1.1:
  - Frequency resource assignment.
  - Time resource assignment.
- PSFCH-to-HARQ feedback timing indicator -$\lceil \log_2 N_{fb\_timing} \rceil$ bits, where $N_{fb\_timing}$ is the
  number of entries in the higher layer parameter sl-PSFCH-ToPUCCH, as defined in clause 16.5 of
  [5, TS 38.213]
- PUCCH resource indicator - 3 bits as defined in clause 16.5 of [5, TS 38.213].
- Configuration index - 0 bit if the UE is not configured to monitor DCI format 3_0 with
  CRC scrambled by SL-CS-RNTI; otherwise 3 bits as defined in clause 8.1.2 of [6, TS 38.214]. If
  the UE is configured to monitor DCI format 3_0 with CRC scrambled by SL-CS-RNTI, this field
  is reserved for DCI format 3_0 with CRC scrambled by SL-RNTI.
- Counter sidelink assignment index - 2 bits
  - 2 bits as defined in clause 16.5.2 of [5, TS 38.213] if the UE is configured with pdsch-
    HARQ-ACK-Codebook = dynamic
  - 2 bits as defined in clause 16.5.1 of [5, TS 38.213] if the UE is configured with pdsch-
    HARQ-ACK-Codebook = semi-static
- Padding bits, if required
■ Format 3_1
DCI format 3_1 is used for scheduling of LTE PSCCH and LTE PSSCH in one cell.
The following information is transmitted by means of the DCI format 3_1 with CRC scrambled by
SL-L-CS-RNTI:
- Timing offset - 3 bits determined by higher layer parameter sl-TimeOffsetEUTRA, as
  defined in clause 16.6 of [5, TS 38.213]
- Carrier indicator -3 bits as defined in 5.3.3.1.9A of [11, TS 36.212].
- Lowest index of the subchannel allocation to the initial transmission - $\lceil \log_2(N_{subchannel}^{SL}) \rceil$
  bits as defined in 5.3.3.1.9A of [11, TS 36.212].
- Frequency resource location of initial transmission and retransmission, as defined in
  5.3.3.1.9A of [11, TS 36.212]
- Time gap between initial transmission and retransmission, as defined in 5.3.3.1.9A of [11,
  TS 36.212]
- SL index - 2 bits as defined in 5.3.3.1.9A of [11, TS 36.212]
- SL SPS configuration index - 3 bits as defined in clause 5.3.3.1.9A of [11, TS 36.212].
- Activation/release indication - 1 bit as defined in clause 5.3.3.1.9A of [11, TS 36.212].

Referring to FIG. 5B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannel(s). For example, subsequently, a first UE which has selected resource(s) from a resource pool by itself may transmit a PSCCH (e.g., sidelink control information (SCI) or 1st-stage SCI) to a second UE by using the resource(s). After then, the first UE may transmit a PSSCH (e.g., 2nd-stage SCI, MAC PDU, data, etc.) related to the PSCCH to the second UE. In step S8030, the first UE may receive a PSFCH related to the PSCCH/PSSCH from the second UE.

Referring to FIGS. 5A and 5B, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1st SCI, a first SCI, a 1st-stage SCI or a 1st-stage SCI format, and a SCI transmitted through a PSSCH may be referred to as a 2nd SCI, a second SCI, a 2nd-stage SCI or a 2nd-stage SCI format. For example, the 1st-stage SCI format may include a SCI format 1-A, and the 2nd-stage SCI format may include a SCI format 2-A and/or a SCI format 2-B. Table 5 shows an example of a 1st-stage SCI format.

TABLE 5

3GPP TS 38.212

■ SCI format 1-A
SCI format 1-A is used for the scheduling of PSSCH and $2^{nd}$-stage-SCI on PSSCH
The following information is transmitted by means of the SCI format 1-A:
- Priority - 3 bits as specified in clause 5.41.3.3 of [12, TS 23.287] and clause 5.22.1.3.1 of [8, TS 38.321].

- Frequency resource assignment - $\left\lceil \log_2\left(\frac{N_{subChannel}^{SL}\left(N_{subChannel}^{SL}+1\right)}{2}\right) \right\rceil$ bits when the value of the higher layer parameter sl-MaxNumPerReserve is configured to 2; otherwise $\left\lceil \log_2\left(\frac{N_{subChannel}^{SL}\left(N_{subChannel}^{SL}+1\right)\left(2N_{subChannel}^{SL}+1\right)}{6}\right) \right\rceil$ bits when the value of the higher layer parameter sl-MaxNumPerReserve is configured to 3, as defined in clause 8.1.2.2 of [6, TS 38.214].
- Time resource assignment - 5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214].
- Resource reservation period - $\lceil \log_2 N_{rsv\_period} \rceil$ bits as defined in clause 8.1.4 of [6, TS 38.214], where $N_{rsv\_period}$ is the number of entries in the higher layr parameter sl-ResourceReservePeriodList, if higher layer parameter sl-MultiReserveResource is configured: 0 bit otherwise.
- DMRS pattern - $\lceil \log_2 N_{pattern} \rceil$ bits as defined in clause 8.4.1.1.2 of [4, TS 38.211], where $N_{pattern}$ is the number of DMRS patterns configured by higher layer parameter sl-PSSCH-DMRS-TimePatternList.
- $2^{nd}$-stage SCI format - 2 bits as defined in Table 8.3.1.1-1.
- Beta_offset indicator - 2 bits as provided by higher layer parameter sl-BetaOffsets2ndSCI and Table 8.3.1.1-2.
- Number of DMRS port - 1 bit as defined in Table 8.3.1.1-3.
- Modulation and coding scheme - 5 bits as defined in clause 8.1.3 of 16, TS 38.214].
- Additional MCS table indicator - as defined in clause 8.1.3.1 of [6. TS 38.214 ]: 1 bit if one MCS table is configured by higher layer parameter sl-Addilional-MCS-Table: 2 bits if two MCS tables are configured by higher layer parameter sl-Additional-MCS-Table; 0 bit otherwise.
- PSFCH overhead indication - 1 bit as defined clause 8.1.3.2 of [6. TS 38.214] if higher layer parameter sl-PSFCH-Period = 2 or 4: 0 bit otherwise.
- Reserved - a number of bits as determined by higher layer parameter sl-NumReservedBits, with value set to zero.

Table 8.3.1.1-1: $2^{nd}$-stage SCI formats

| Value of 2nd-stage SCI format field | 2nd-stage SCI format |
|---|---|
| 00 | SCI format 2-A |
| 01 | SCI format 2-B |
| 10 | Reserved |
| 11 | Reserved |

Table 8.3.1.1-2: Mapping of Beta_offset indicator values to indexes in Table 9.3-2 of [5, TS38.213]

| Value of Beta_offset indicator | Beta_offset index in Table 9.3-2 of [5, TS38.213] |
|---|---|
| 00 | 1st index provided by higher layer parameter sl-BetaOffsets2ndSCI |
| 01 | 2nd index provided by higher layer parameter sl-BetaOffsets2ndSCI |
| 10 | 3rd index provided by higher layer parameter sl-BetaOffsets2ndSCI |
| 11 | 4th index provided by higher layer parameter sl-BetaOffsets2ndSCI |

Table 6 shows an example of a 2nd-stage SCI format.

TABLE 6

3GPP TS 38.212

■ SCI format 2-A
SCI format 2-A is used for the decoding of PSSCH, with HARQ operation when HARQ-ACK information includes ACK or NACK, when HARQ-ACK information includes only NACK, or when there is no feedback of HARQ-ACK information.
The following information is transmitted by means of the SCI format 2-A:
- HARQ process number - 4 bits as defined in clause 16.4 of [5, TS 38.213].
- New data indicator - 1 bit as defined in clause 16.4 of [5, TS 38.213].
- Redundancy version - 2 bits as defined in clause 16.4 of [6, TS 38.214].
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Cast type indicator - 2 bits as defined in Table 8.4.1.1-1.
- CSI request - 1 bit as defined in clause 8.2.1 of [6, TS 38.214].

Table 8.4.1.1-1: Cast type indicator

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

■ SCI format 2-B
SCI format 2-B is used for the decoding of PSSCH, with HARQ operation when HARQ-ACK information includes only NACK, or when there is no feedback of HARQ-ACK information.
The following information is transmitted by means of the SCI format 2-B:
- HARQ process number - 4 bits as defined in clause 16.4 of [5, TS 38.213].
- New data indicator - 1 bit as defined in clause 16.4 of [5, TS 38.213].
- Redundancy version - 2 bits as defined in clause 16.4 of [6, TS 38.214].
- Source ID - 8 bits as defined in clause 8.1 of [6, TS 38.214].
- Destination ID - 16 bits as defined in clause 8.1 of [6, TS 38.214].
- HARQ feedback enabled/disabled indicator - 1 bit as defined in clause 16.3 of [5, TS 38.213].
- Zone ID - 12 bits as defined in clause 5.8.11 of [9, TS 38.331].
- Communication range requirement - 4 bits determined by higher layer parameter sl-ZoneConfigMCR-Index.

Referring to FIGS. 5A and 5B, the first UE may receive 40 the PSFCH based on Table 7. For example, the first UE and the second UE may determine a PSFCH resource based on Table 7, and the second UE may transmit HARQ feedback to the first UE using the PSFCH resource.

TABLE 7

3GPP TS 38.213

■ UE procedure for reporting HARQ-ACK on sidelink
A UE can be indicated by an SCI format scheduling a PSSCH reception, in one or more sub-channels from a number of $N_{subch}^{PSSCH}$ sub-channels, to transmit a PSFCH with HARQ-ACK information in response to the PSSCH reception. The UE provides HARQ-ACK information that includes ACK or NACK, or only NACK.
A UE can be provided, by sl-PSFCH-Period-r16, a number of slots in a resource pool for a period of PSFCH transmission occasion resources. If the number is zero, PSFCH transmissions from the UE in the resource pool are disabled.
A UE expects that a slot $t'^{SL}_k$ ($0 \le k < T'_{max}$) has a PSFCH transmission occasion resource if k mod $N_{PSSCH}^{PSFCH}$ = 0, where $t'^{SL}_k$ is defined in [6, TS 38.214], and $T'_{max}$ is a number of slots that belong to the resource pool within 10240 msec according to [6, TS 38.214], and $N_{PSSCH}^{PSFCH}$ is provided by sl-PSFCH-Period-r16.
A UE may be indicated by higher layers to not transmit a PSFCH in response to a PSSCH reception [11, TS 38.321].
If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

TABLE 7-continued

3GPP TS 38.213

A UE is provided by sl-PSFCH-RB-Set-r16 a set of $M_{PRB,set}^{PSFCH}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N_{PSSCH}^{PSFCH}$, the UE allocates the [(i + j · $N_{PSSCH}^{PSFCH}$) · $M_{subch,slot}^{PSFCH}$, (i + 1 + j · $N_{PSSCH}^{PSFCH}$) · $M_{subch,slot}^{PSFCH}$ − 1] PRBs from the $M_{PRB,set}^{PSFCH}$ PRBs to slot i among the PSSCH slots associated with the PSFCH slot and sub-channel j, where $M_{subch,slot}^{PSFCH} = M_{PRB,set}^{PSFCH}/(N_{subch} · N_{PSSCH}^{PSFCH})$, $0 \le i < N_{PSSCH}^{PSFCH}$, $0 \le j < N_{subch}$, and the allocation starts in an ascending order of i and continues in an ascending order of j.
The UE expects that $M_{PRB,set}^{PSFCH}$ is a multiple of $N_{subch} · N_{PSSCH}^{PSFCH}$.
A UE determines a number of PSFCH resources available for multiplexing HARQ-ACK information in a PSFCH transmission as $R_{PRB,CS}^{PSFCH} = N_{type}^{PSFCH} · M_{subch,slot}^{PSFCH} · N_{CS}^{PSFCH}$ where $N_{CS}^{PSFCH}$ is a number of cyclic shift pairs for the resource pool and, based on an indication by higher layers,
- $N_{type}^{PSFCH} = 1$ and the $M_{subch,slot}^{PSFCH}$ PRBs are associated with the starting sub-channel of the corresponding PSSCH
- $N_{type}^{PSFCH} = N_{subch}^{PSSCH}$ and the $N_{subch}^{PSSCH} · M_{subch,slot}^{PSFCH}$ PRBs are associated with one or more sub-channels from the $N_{subch}^{PSSCH}$ sub-channels of the corresponding PSSCH The PSFCH resources are first indexed according to an ascending order of the PRB index, from the $N_{type}^{PSFCH} · M_{subch,slot}^{PSFCH}$ PRBs, and then according to an ascending order of the cyclic shift pair index from the $N_{CS}^{PSFCH}$ cyclic shift pairs.
A UE determines an index of a PSFCH resource for a PSFCH transmission in response to a PSSCH reception as $(P_{ID} + M_{ID})\text{mod}R_{PRB,CS}^{PSFCH}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.
A UE determines a $m_0$ value, for computing a value of cyclic shift α [4, TS 38.211], from a cyclic shift pair index corresponding to a PSFCH resource index and from $N_{CS}^{PSFCH}$ using Table 16.3-1.

Table 16.3-1: Set of cyclic shift pairs

| | $m_0$ | | | | | |
|---|---|---|---|---|---|---|
| $N_{CS}^{PSFCH}$ | Cyclic Shift Pair Index 0 | Cyclic Shift Pair Index 1 | Cyclic Shift Pair Index 2 | Cyclic Shift Pair Index 3 | Cyclic Shift Pair Index 4 | Cyclic Shift Pair Index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift a [4, TS 38.211], as in Table 16.3-2 if the UE detects a SCI format 2-A with Cast type indicator field value of "01" or "10", or as in Table 16.3-3 if the UE detects a SCI format 2-B or a SCI format 2-A with Cast type indicator field value of "11". The UE applies one cyclic shift from a cyclic shift pair to a sequence used for the PSFCH transmission [4, TS 38.211].

Table 16.3-2: Mapping of HARQ-ACK information bit values to a cyclic shift, from a cyclic shift pair, of a sequence for a PSFCH transmission when HARQ-ACK information includes ACK or NACK

| HARQ-ACK Value | 0 (NACK) | 1 (ACK) |
|---|---|---|
| Sequence cyclic shift | 0 | 6 |

Table 16.3-3: Mapping of HARQ-ACK information bit values to a cyclic shift, from a cyclic shift pair, of a sequence for a PSFCH transmission when HARQ-ACK information includes only NACK

| HARQ-ACK Value | 0 (NACK) | 1 (ACK) |
|---|---|---|
| Sequence cyclic shift | 0 | N/A |

Referring to FIG. 5A, the first UE may transmit SL HARQ feedback to the base station through the PUCCH and/or the PUSCH based on Table 8.

TABLE 8

3GPP TS 38.213

16.5 UE procedure for reporting HARQ-ACK on uplink
A UE can be provided PUCCH resources or PUSCH resources [12, TS 38.331] to report HARQ-ACK information that the UE generates based on HARQ-ACK information that the UE obtains

TABLE 8-continued

3GPP TS 38.213 from PSFCH receptions, or from absence of PSFCH receptions. The UE reports HARQ-ACK information on the primary cell of the PUCCH group, as described in Clause 9, of the cell where the UE monitors PDCCH for detection of DCI format 3_0.
For SL configured grant Type 1 or Type 2 PSSCH transmissions by a UE within a time period provided by sl-PeriodCG, the UE generates one HARQ-ACK information bit in response to the PSFCH receptions to multiplex in a PUCCH transmission occasion that is after a last time resource, in a set of time resources.
For PSSCH transmissions scheduled by a DCI format 3_0, a UE generates HARQ-ACK information in response to PSFCH receptions to multiplex in a PUCCH transmission occasion that is after a last time resource in a set of time resources provided by the DCI format 3_0.
For each PSFCH reception occasion, from a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information, when applicable
- if the UE receives a PSFCH associated with a SCI format 2-A with Cast type indicator field value of "10"
  - generate HARQ-ACK information with same value as a value of HARQ-ACK information the UE determines from a PSFCH reception in the PSFCH reception occasion and, if the UE determines that a PSFCH is not received at the PSFCH reception occasion, generate NACK
- if the UE receives a PSFCH associated with a SCI format 2-A with Cast type indicator field value of "01"
  - generate ACK if the UE determines ACK from at least one PSFCH reception occasion, from the number of PSFCH reception occasions, in PSFCH resources corresponding to every identity $M_{ID}$ of the UEs that the UE expects to receive the PSSCH, as described in Clause 16.3; otherwise, generate NACK
- if the UE receives a PSFCH associated with a SCI format 2-B or a SCI format 2-A with Cast type indicator field value of "11"
  - generate ACK when the UE determines absence of PSFCH reception for each PSFCH reception occasion from the number of PSFCH reception occasions; otherwise, generate NACK After a UE transmits PSSCHs and receives PSFCHs in corresponding PSFCH resource occasions, the priority value of HARQ-ACK information is same as the priority value of the PSSCH transmissions that is associated with the PSFCH reception occasions providing the HARQ-ACK information.
The UE generates a NACK when, due to prioritization, as described in Clause 16.2.4, the UE does not receive PSFCH in any PSFCH reception occasion associated with a PSSCH transmission in a resource provided by a DCI format 3_0 with CRC scrambled by a SL-RNTI or, for a configured grant, in a resource provided in a single period and for which the UE is provided a PUCCH resource to report HARQ-ACK information. The priority value of the NACK is same as the priority value of the PSSCH transmission.
The UE generates a NACK when, due to prioritization as described in Clause 16.2.4, the UE does not transmit a PSSCH in any of the resources provided by a DCI format 3_0 with CRC scrambled by SL-RNTI or, for a configured grant, in any of the resources provided in a single period and for which the UE is provided a PUCCH resource to report HARQ-ACK information. The priority value of the NACK is same as the priority value of the PSSCH that was not transmitted due to prioritization.
The UE generates an ACK if the UE does not transmit a PSCCH with a SCI format 1-A scheduling a PSSCH in any of the resources provided by a configured grant in a single period and for which the UE is provided a PUCCH resource to report HARQ-ACK information. The priority value of the ACK is same as the largest priority value among the possible priority values for the configured grant.
A UE does not expect to be provided PUCCH resources or PUSCH resources to report HARQ-ACK information that start earlier than $(N + 1) \cdot (2048 + 144) \cdot \kappa \cdot 2^{\mu} \cdot T_c$ after the end of a last symbol of a last PSFCH reception occasion, from a number of PSFCH reception occasions that the UE generates HARQ-ACK information to report in a PUCCH or PUSCH transmission, where
- $\kappa$ and $T_c$ are defined in [4, TS 38.211]
- $\mu = \min(\mu_{SL}, \mu_{UL})$, where $\mu_{SL}$ is the SCS configuration of the SL BWP and $\mu_{UL}$ is the SCS configuration of the active UL BWP on the primary cell
- N is determined from $\mu$ according to Table 16.5-1

Table 16.5-1: Values of N

| $\mu$ | N |
|---|---|
| 0 | 14 |
| 1 | 18 |
| 2 | 28 |
| 3 | 32 |

With reference to slots for PUCCH transmissions and for a number of PSFCH reception occasions ending in slot n, the UE provides the generated HARQ-ACK information in a PUCCH transmission within slot n + k, subject to the overlapping conditions in Clause 9.2.5, where k is a number of slots indicated by a PSFCH-to-HARQ_feedback timing indicator field, if present, in a DCI format indicating a slot for PUCCH transmission to report the HARQ-ACK information, or k is provided by sl-PSFCH-ToPUCCH-CG-Type1-r16. k = 0 corresponds to a last slot for a PUCCH transmission that would overlap with the last PSFCH reception occasion assuming that the start of the sidelink frame is same as the start of the downlink frame [4, TS 38.211].

TABLE 8-continued

3GPP TS 38.213

For a PSSCH transmission by a UE that is scheduled by a DCI format, or for a SL configured grant Type 2 PSSCH transmission activated by a DCI format, the DCI format indicates to the UE that a PUCCH resource is not provided when a value of the PUCCH resource indicator field is zero and a value of PSFCH-to-HARQ feedback timing indicator field, if present, is zero. For a SL configured grant Type 1 PSSCH transmission, a PUCCH resource can be provided by sl-N1PUCCH-AN-r16 and sl-PSFCH-ToPUCCH-CG-Type1-r16. If a PUCCH resource is not provided, the UE does not transmit a PUCCH with generated HARQ-ACK information from PSFCH reception occasions.
For a PUCCH transmission with HARQ-ACK information, a UE determines a PUCCH resource after determining a set of PUCCH resources for $O_{UCI}$ HARQ-ACK information bits, as described in Clause 9.2.1. The PUCCH resource determination is based on a PUCCH resource indicator field [5, TS 38.212] in a last DCI format 3_0, among the DCI formats 3_0 that have a value of a PSFCH-to-HARQ_feedback timing indicator field indicating a same slot for the PUCCH transmission, that the UE detects and for which the UE transmits corresponding HARQ-ACK information in the PUCCH where, for PUCCH resource determination, detected DCI formats are indexed in an ascending order across PDCCH monitoring occasion indexes.
A UE does not expect to multiplex HARQ-ACK information for more than one SL configured grants in a same PUCCH.
A priority value of a PUCCH transmission with one or more sidelink HARQ-ACK information bits is the smallest priority value for the one or more HARQ-ACK information bits.
In the following, the CRC for DCI format 3_0 is scrambled with a SL-RNTI or a SL-CS-RNTI.

Figure 6A:
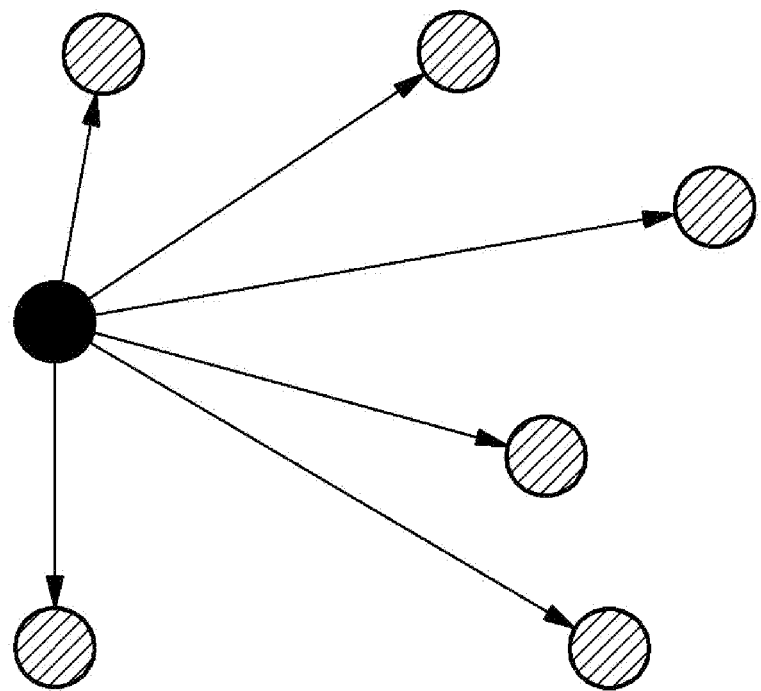
FIG. 6A to FIG. 6C illustrate 3 cast types according to an embodiment of the present disclosure.
Figure 6B:
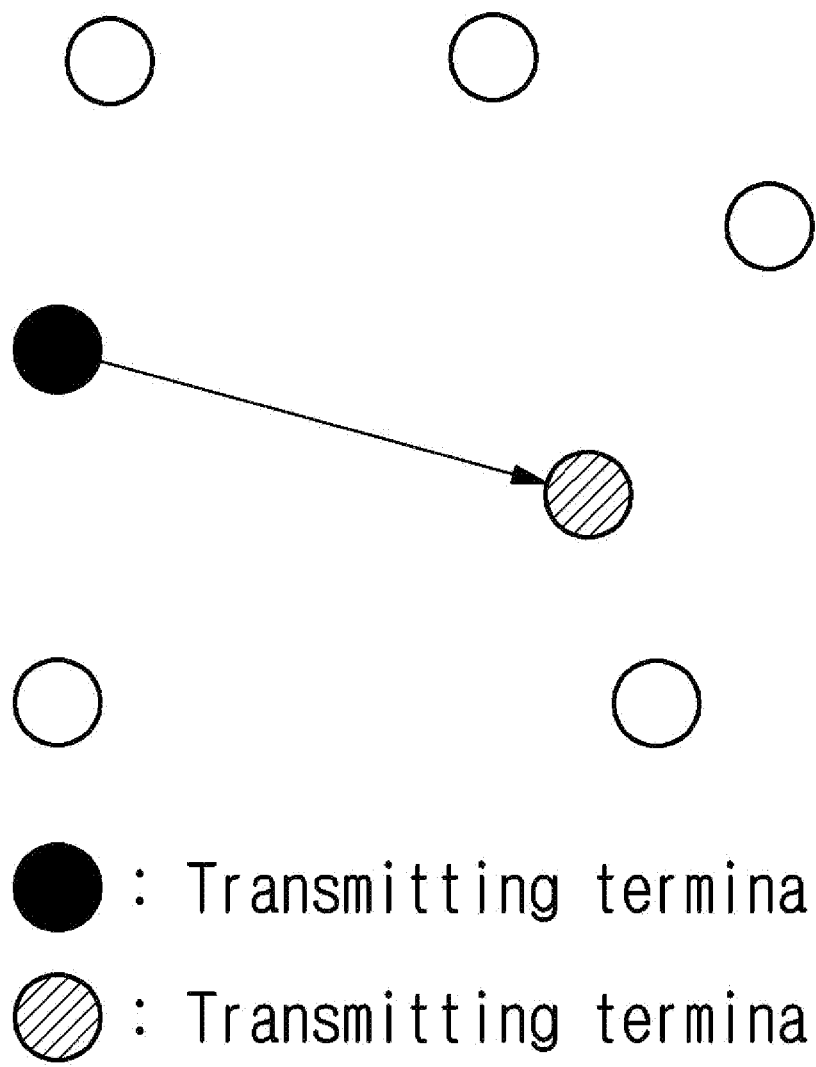
Figure 6C:
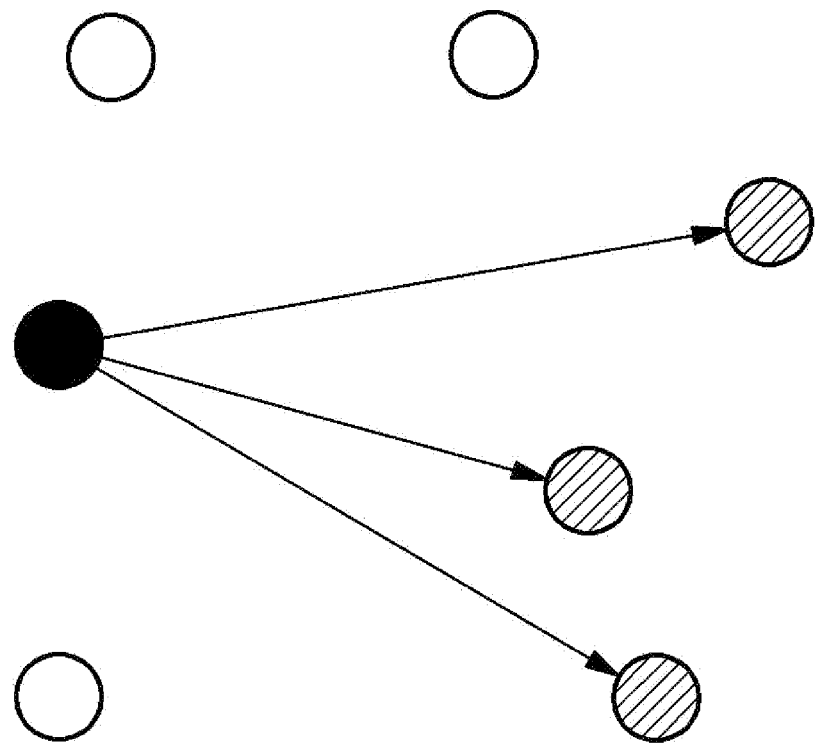

FIGS. 6A to 6C illustrate three cast types applicable to the present disclosure. The embodiment of FIGS. 6A to 6C may be combined with various embodiments of the present disclosure.

Specifically, FIG. 6A exemplifies broadcast-type SL communication, FIG. 6B exemplifies unicast type-SL communication, and FIG. 6C exemplifies groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hybrid Automatic Request (HARQ) Procedure

SL HARQ feedback may be enabled for unicast. In this case, in a non-code block group (non-CBG) operation, when the receiving UE decodes a PSCCH directed to it and succeeds in decoding an RB related to the PSCCH, the receiving UE may generate an HARQ-ACK and transmit the HARQ-ACK to the transmitting UE. On the other hand, after the receiving UE decodes the PSCCH directed to it and fails in decoding the TB related to the PSCCH, the receiving UE may generate an HARQ-NACK and transmit the HARQ-NACK to the transmitting UE.

For example, SL HARQ feedback may be enabled for groupcast. For example, in a non-CBG operation, two HARQ feedback options may be supported for groupcast.

(1) Groupcast option 1: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may not transmit an HARQ-ACK to the transmitting UE.

(2) Groupcast option 2: When the receiving UE decodes a PSCCH directed to it and then fails to decode a TB related to the PSCCH, the receiving UE transmits an HARQ-NACK on a PSFCH to the transmitting UE. On the contrary, when the receiving UE decodes the PSCCH directed to it and then succeeds in decoding the TB related to the PSCCH, the receiving UE may transmit an HARQ-ACK to the transmitting UE on the PSFCH.

For example, when groupcast option 1 is used for SL HARQ feedback, all UEs performing groupcast communication may share PSFCH resources. For example, UEs belonging to the same group may transmit HARQ feedbacks in the same PSFCH resources.

For example, when groupcast option 2 is used for SL HARQ feedback, each UE performing groupcast communication may use different PSFCH resources for HARQ feedback transmission. For example, UEs belonging to the same group may transmit HARQ feedbacks in different PSFCH resources.

In the present disclosure, HARQ-ACK may be referred to as ACK, ACK information, or positive-ACK information, and HARQ-NACK may be referred to as NACK, NACK information, or negative-ACK information.

SL Measurement and Reporting

For the purpose of QoS prediction, initial transmission parameter setting, link adaptation, link management, admission control, and so on, SL measurement and reporting (e.g., an RSRP or an RSRQ) between UEs may be considered in SL. For example, the receiving UE may receive an RS from the transmitting UE and measure the channel state of the transmitting UE based on the RS. Further, the receiving UE may report CSI to the transmitting UE. SL-related measurement and reporting may include measurement and reporting of a CBR and reporting of location information. Examples of CSI for V2X include a channel quality indicator (CQI), a precoding matrix index (PMI), a rank indicator (RI), an RSRP, an RSRQ, a path gain/pathloss, an SRS resource indicator (SRI), a CSI-RS resource indicator (CRI), an interference condition, a vehicle motion, and the like. CSI reporting may be activated and deactivated depending on a configuration.

For example, the transmitting UE may transmit a channel state information-reference signal (CSI-RS) to the receiving UE, and the receiving UE may measure a CQI or RI using the CSI-RS. For example, the CSI-RS may be referred to as an SL CSI-RS. For example, the CSI-RS may be confined to PSSCH transmission. For example, the transmitting UE may transmit the CSI-RS in PSSCH resources to the receiving UE.

Sidelink Congestion Control

For example, the UE may determine whether an energy measured in a unit time/frequency resource is equal to or greater than a predetermined level and control the amount and frequency of its transmission resources according to the ratio of unit time/frequency resources in which the energy equal to or greater than the predetermined level is observed. In the present disclosure, a ratio of time/frequency resources in which an energy equal to or greater than a predetermined level is observed may be defined as a CBR. The UE may measure a CBR for a channel/frequency. In addition, the UE may transmit the measured CBR to the network/BS.

Figure 7:
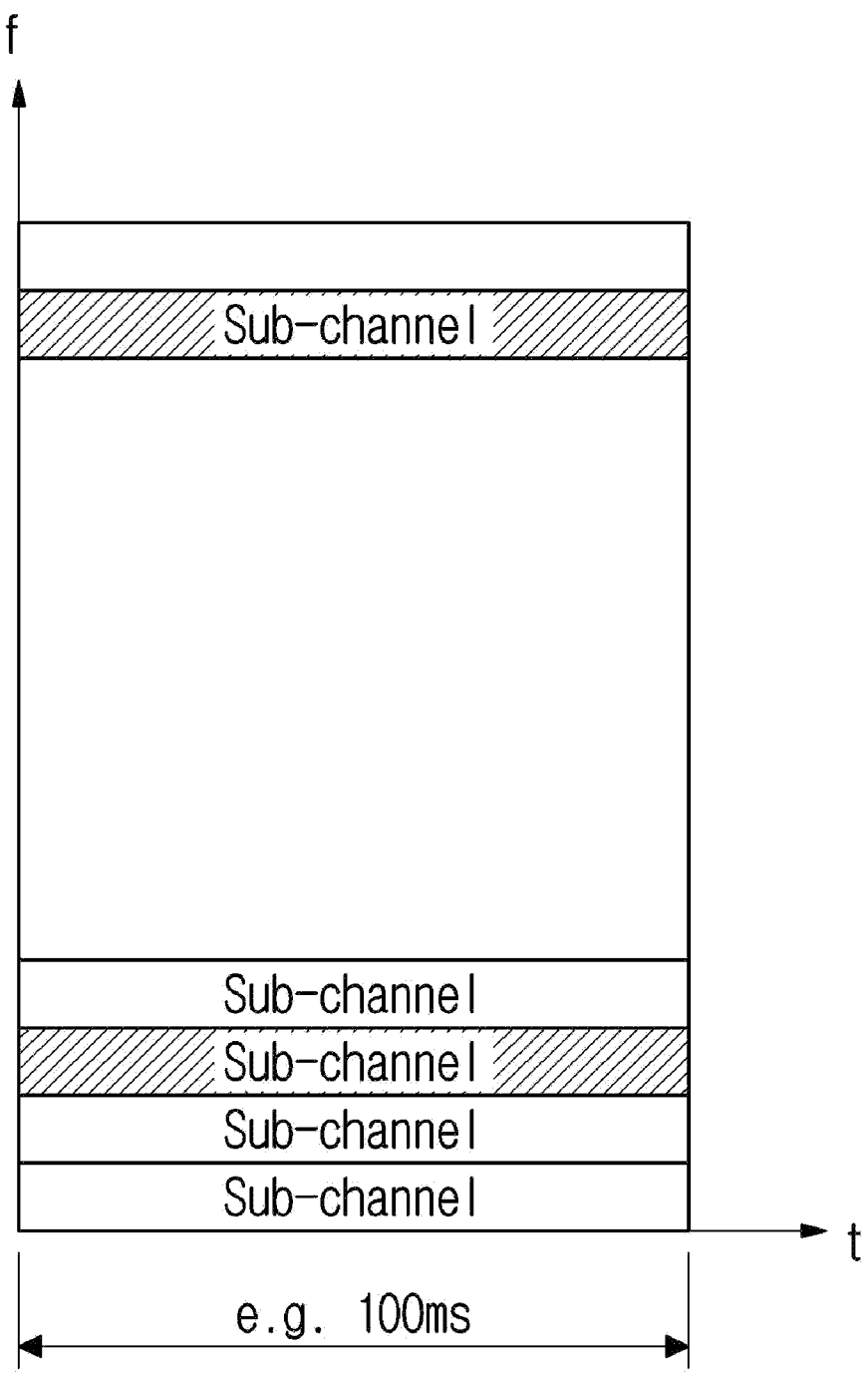
FIG. 7 illustrates a resource unit for CBR measurement according to an embodiment of the present disclosure.

FIG. 7 illustrates resource units for CBR measurement applicable to the present disclosure. The embodiment of FIG. 7 may be combined with various embodiments of the present disclosure.

Referring to FIG. 7, a CBR may refer to the number of subchannels of which the RS SI measurements are equal to or larger than a predetermined threshold as a result of measuring an RSSI in each subchannel during a specific period (e.g., 100 ms) by a UE. Alternatively, a CBR may refer to a ratio of subchannels having values equal to or greater than a predetermined threshold among subchannels during a specific period. For example, in the embodiment of FIG. 7, on the assumption that the hatched subchannels have values greater than or equal to a predetermined threshold, the CBR may refer to a ratio of hatched subchannels for a time period of 100 ms. In addition, the UE may report the CBR to the BS.

For example, when a PSCCH and a PSSCH are multiplexed in a frequency domain, the UE may perform one CBR measurement in one resource pool. When PSFCH resources are configured or preconfigured, the PSFCH resources may be excluded from the CBR measurement.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

An example of SL CBR and SL RSSI is as follows. In the description below, the slot index may be based on a physical slot index.

A SL CBR measured in slot n is defined as the portion of sub-channels in the resource pool whose SL RSSI measured by the UE exceed a (pre-)configured threshold sensed over a CBR measurement window [n−a, n−1]. Herein, a is equal to 100 or 100·2µ slots, according to higher layer parameter sl-TimeWindowSizeCBR. The SL CBR is applicable for RRC_IDLE intra-frequency, RRC_IDLE inter-frequency, RRC_CONNECTED intra-frequency, or RRC_CONNECTED inter-frequency A SL RSSI is defined as the linear average of the total received power (in [W]) observed in the configured sub-channel in OFDM symbols of a slot configured for PSCCH and PSSCH, starting from the 2nd OFDM symbol. For frequency range 1, the reference point for the SL RSSI shall be the antenna connector of the UE. For frequency range 2, SL RSSI shall be measured based on the combined signal from antenna elements corresponding to a given receiver branch. For frequency range 1 and 2, if receiver diversity is in use by the UE, the reported SL RSSI value shall not be lower than the corresponding SL RSSI of any of the individual receiver branches. The SL RSSI is applicable for RRC_IDLE intra-frequency, RRC_IDLE inter-frequency, RRC_CONNECTED intra-frequency or RRC_CONNECTED inter-frequency.

An example of an SL (Channel occupancy Ratio) is as follows. The SL CR evaluated at slot n is defined as the total number of sub-channels used for its transmissions in slots [n−a, n−1] and granted in slots [n, n+b] divided by the total number of configured sub-channels in the transmission pool over [n−a, n+b]. The SL CR is applicable for RRC_IDLE intra-frequency, RRC_IDLE inter-frequency, RRC_CONNECTED intra-frequency or RRC_CONNECTED inter-frequency. Herein, a may be a positive integer and b may be 0 or a positive integer. a and b may be determined by UE implementation with a+b+1=1000 or 1000·2µ slots, according to higher layer parameter sl-TimeWindowSizeCR, b<(a+b+1)/2, and n+b shall not exceed the last transmission opportunity of the grant for the current transmission. The SL CR is evaluated for each (re)transmission. In evaluating SL CR, the UE shall assume the transmission parameter used at slot n is reused according to the existing grant(s) in slot [n+1, n+b] without packet dropping. The slot index is based on physical slot index. The SL CR can be computed per priority level. A resource is considered granted if it is a member of a selected sidelink grant as defined in TS 38.321.

Positioning

Figure 8:
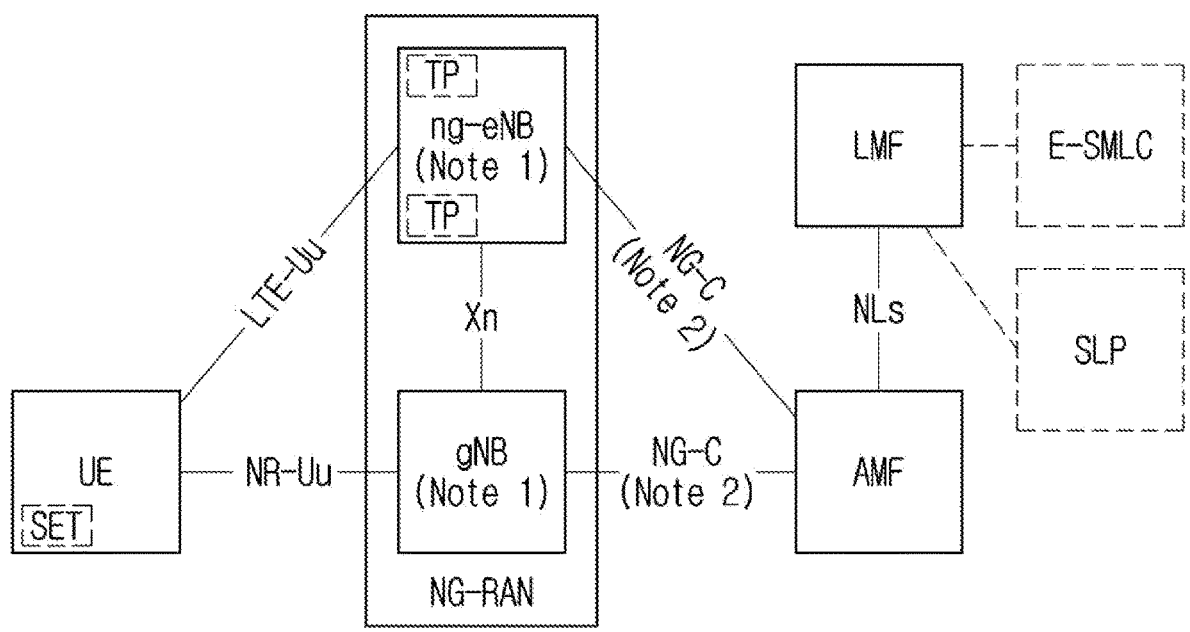
FIG. 8 illustrates an example of an architecture in a 5G system, in which positioning is possible for a UE connected with a next generation-radio access network (NR-RAN) or E-UTRAN, according to an embodiment of the present disclosure.

FIG. 8 illustrates an example of an architecture of a 5G system capable of positioning a UE connected to an NG-RAN or an E-UTRAN applicable to the present disclosure.

Referring to FIG. 8, an AMF may receive a request for a location service related to a specific target UE from another entity such as a gateway mobile location center (GMLC) or may autonomously determine to initiate the location service on behalf of the specific target UE. The AMF may then transmit a location service request to a location management function (LMF). Upon receipt of the location service request, the LMF may process the location service request and return a processing result including information about an estimated location of the UE to the AMF. On the other hand, when the location service request is received from another entity such as the GMLC, the AMF may deliver the processing result received from the LMF to the other entity.

A new generation evolved-NB (ng-eNB) and a gNB, which are network elements of an NG-RAN capable of providing measurement results for positioning, may measure radio signals for the target UE and transmit result values to the LMF. The ng-eNB may also control some transmission points (TPs) such as remote radio heads or positioning reference signal (PRS)-dedicated TPs supporting a PRS-based beacon system for an E-UTRA.

The LMF is connected to an enhanced serving mobile location center (E-SMLC), and the E-SMLC may enable the LMF to access an E-UTRAN. For example, the E-SMLC may enable the LMF to support observed time difference of arrival (OTDOA), which is one of positioning methods in the E-UTRAN, by using DL measurements obtained by the target UE through signals transmitted by the eNB and/or the PRS-dedicated TPs in the E-UTRAN.

The LMF may be connected to an SUPL location platform (SLP). The LMF may support and manage different location determination services for target UEs. The LMF may interact with the serving ng-eNB or serving gNB of a target UE to obtain a location measurement of the UE. For positioning the target UE, the LMF may determine a positioning method based on a location service (LCS) client type, a QoS requirement, UE positioning capabilities, gNB positioning capabilities, and ng-eNB positioning capabilities, and apply the positioning method to the serving gNB and/or the serving ng-eNB. The LMF may determine additional information such as a location estimate for the target UE and the accuracy of the position estimation and a speed. The SLP is a secure user plane location (SUPL) entity responsible for positioning through the user plane.

The UE may measure a DL signal through sources such as the NG-RAN and E-UTRAN, different global navigation satellite systems (GNSSes), a terrestrial beacon system (TBS), a wireless local area network (WLAN) access point, a Bluetooth beacon, and a UE barometric pressure sensor. The UE may include an LCS application and access the LCS application through communication with a network to which the UE is connected or through another application included in the UE. The LCS application may include a measurement and calculation function required to determine the location of the UE. For example, the UE may include an independent positioning function such as a global positioning system (GPS) and report the location of the UE independently of an NG-RAN transmission. The independently obtained positioning information may be utilized as auxiliary information of positioning information obtained from the network.

Concrete Embodiment of the Present Disclosure

When resource allocation is performed in a new radio (NR) vehicle to everything (V2X) out-of-coverage situation, a sensing window period may be present. The sensing window period may be a period in which a resource is transmitted and a period in which an operation of allocating a location of a resource is performed. An operation of allocating a location of a resource may be an operation of allocating a location of a resource in a sub-channel and is not limited to the above-described embodiment. The above-described operation of NR V2X may be mostly the same as an operation of LTE V2X. The mmWave beam may have strong straightness. In addition, the mmWave beam has a strong NLOS (nonlight of sight) feature. In addition, the mmWave may be a narrow beam. In the case of LTE, the channel environment in every direction of a beam may be measured at the same time. When the channel environment cannot be measured simultaneously in every direction of a beam, the channel environment may be measured only in a region that the beam can cover. Due to an operation of measuring the channel environment only in such a region that a beam can cover, a terminal or a base station may have a limitation in selecting a resource period accurately.

As for V2X, when transmitting to a receiving terminal with a beam being formed, a transmission terminal may select a resource. The transmission terminal may find an empty resource period to transmit data and transmit, to the receiving terminal, a negotiation message regarding whether or not the period is available. As an example, the transmission terminal may transmit a negotiation message in a data form in a sensing window period to the receiving terminal. In addition, a period for transmitting data may be predefined as a fixed resource period within a radio resource channel (RRC). The receiving terminal may receive a negotiation message. Next, the receiving terminal may determine whether or not data can be received in the period and transmit a response message to the transmission terminal. In addition, the receiving terminal may additionally broadcast to adjacent neighbor terminals (equipment, UEs). The above-described negotiation scheme is a 2-way message scheme. In addition, the above-described negotiation scheme may have a burden continuously until negotiation is established. In addition, the above-described negotiation scheme defines unicast but not groupcast.

When transmitting and receiving a resource between terminals, a terminal may allocate a resource with the help of a base station. In case a terminal has a history of being connected to a base station, the terminal may use a resource list, which the base station allocated, in an out-of-coverage situation. As an example, in an out-of-coverage situation, the terminal may make a random selection from the resource list that the base station allocated. This method has a problem of dependency on the base station. In addition, this method may not be suitable for mmWave beam-based communication.

In case there is a platoon group between a transmission terminal and a receiving terminal, the platoon group may be restricted not to use some resources. In such a case, resources may not be efficiently allocated.

The present disclosure includes a scheme of using an initial beam alignment procedure by a receiving terminal (Rx UE) and a transmission terminal (Tx UE), not a negotiation scheme. The present disclosure proposes a scheme of sharing an appointed transmission/receiving time between a receiving terminal and a transmission terminal in a beam alignment procedure. In addition, the present disclosure proposes a scheme of sharing a resource pool that a receiving terminal and a transmission terminal want to use in a beam alignment procedure. In addition, the present disclosure proposes a method in which a receiving terminal and a transmission terminal use information shared in a beam alignment procedure during subsequent data transmission/receiving. In addition, the present disclosure proposes a method in which a receiving terminal and a transmission terminal minimize a negotiation procedure by using information shared in a beam alignment procedure for data transmission/receiving.

In addition, the present disclosure describes a problem that may occur when a terminal uses an mmWave-based beam. Platooning may mean a herding behavior by which cars on a same lane form a group. The terms "vehicle", "car", "terminal" and "node" may be used interchangeably. A group may have a leader node. The leader node may play a role of leading the group. The leader node may manage a resource of nodes that belong to the group. When there is a base station nearby, the leader node may be connected to the base station and deliver network information to the nodes of the group. The present disclosure proposes a method for reducing interference between platoon groups in an mmWave beam environment. The present disclosure proposes a method for controlling some resources in an application layer. In platooning, transmission/receiving between a leader node and another leader node is very important. Accordingly, resource allocation of a leader node should have better quality than nodes in a platooning group. The present disclosure proposes a method for efficiently allocating a resource in consideration of such information.

Figure 9:
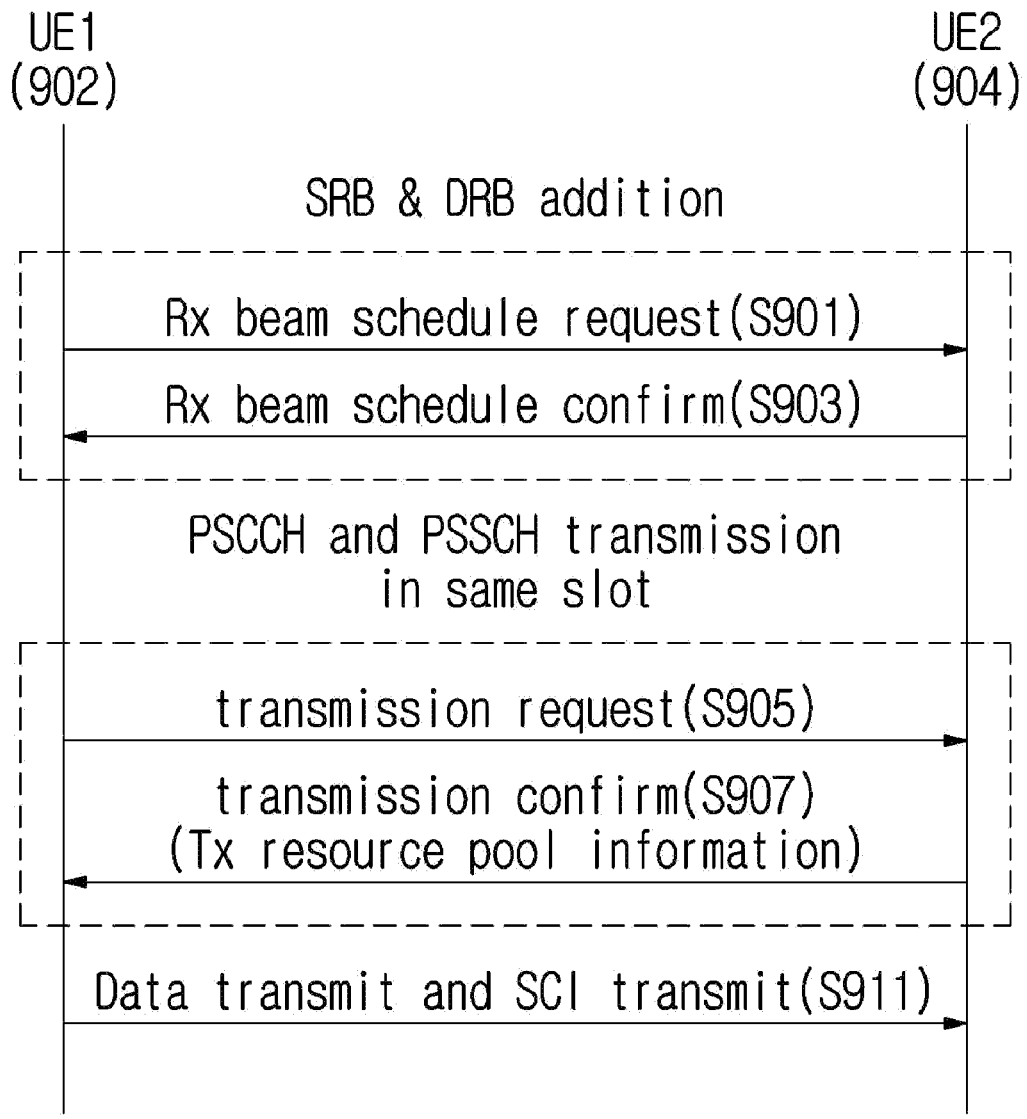
FIG. 9 is a view illustrating an example of a method of allocating a resource, which is applicable to the present disclosure.

FIG. 9 is a view illustrating an example of a method of allocating a resource, which is applicable to the present disclosure. Referring to FIG. 9, a procedure may consist of two main stages. More particularly, the procedure may consist of a Rx beam scheduling stage and a data transmission stage. A terminal may inform another terminal of a time in which it can receive data per beam. A time for receiving data may be added at a signaling radio bearer (SRB) and data radio bearer (DRB) addition stage.

Hereinafter, the Rx beam scheduling stage will be described. The Rx beam scheduling stage may include an operation of notifying a time in which a terminal can receive data per beam. The terminal 1 902 may be a transmission terminal. The terminal 2 904 may be a receiving terminal.

At step S901, the terminal 1 may transmit a Rx beam schedule request message to the terminal 2. As an example, the terminal 1 may transmit a sidelink synchronization signal (SLSS) and a master information block (MIB) and send a Rx beam schedule request message to the terminal 2. In addition, since the terminal 1 may receive data from the terminal 2 later, the terminal 1 may transmit a Rx beam schedule request including corresponding Rx scheduling information to the terminal 2. The Rx beam scheduling request message may include Tx beam direction information and Rx beam schedule information. In addition, the Rx beam scheduling request message may include lane information. The Tx beam direction information may be direction information of a beam to be transmitted. As an example, the Tx beam direction information may include information on 8 directions of a beam to be transmitted. Beam directions may be various and are not limited to the above-described embodiment. The lane information may include information on a lane where a transmission terminal is currently located.

The Rx beam schedule information may include Rx beam schedule information for a plurality of beams. As an example, the Rx beam schedule information may configure 64 beams. That is, the Rx beam schedule information may set schedule information for 64 beams. The Rx beam schedule information may include Rx beam timing, Rx resource pool information. The Rx beam timing information may include information on timing for a transmission terminal to receive data later. The Rx beam resource pool information may include information on a resource pool in which the transmission terminal may receive data later.

At step S903, the terminal 2 may transmit a Rx beam schedule confirm message to the terminal 1. When receiving the message, the terminal 2 may transmit its information to the terminal 1. Contents of the Rx beam schedule confirm message may be identical with the Rx beam schedule request message. That is, the Rx beam schedule confirm message may include Tx beam direction information and Rx beam schedule information of the terminal 2. In addition, the Rx beam scheduling confirm message may include lane information of the terminal 2. The terminal 2 may configure its Rx beam timing and its Rx resource pool information not to overlap with information included in the request message received from the terminal 1. As an example, the terminal 2 may configure its Rx beam timing to be different from the Rx beam timing of the terminal 1, which is received from the terminal 1. As another example, the terminal 2 may configure its Rx resource pool to be different from the Rx resource pool of the terminal 1, which is received from the terminal 1. Through the above-described procedure, the terminal 1 and the terminal 2 may know each other's information. The Rx beam scheduling request message and the Rx beam scheduling confirm message may be transmitted in a physical sidelink control channel (PSCCH) and in a physical sidelink shared channel (PSSCH). PSCCH and PSSCH transmissions may be performed in a same slot.

Hereinafter, the data transmission stage will be described. At step S905, the terminal 1 may transmit a transmit request message to the terminal 2. As an example, the terminal 1 may transmit the transmit request message to the terminal 2 in a sensing window period in order to transmit data. The transmit request message may include a time resource, a frequency resource, a Tx data size, a RSRP measurement value per subchannel of an aligned beam, a beam direction, and lane information. The time resource may include slot information. Time resource information may include time information for a period in which a confirm message may be received. The frequency resource information may include subchannel information. The frequency resource information may include frequency information for a confirm message receiving period. A transmission request message may be transmitted based on the Rx beam timing of the terminal 2, which the terminal 1 already knows. As an example, the transmission request message may be transmitted through PSCCH based on the Rx beam timing of the terminal 2, which the terminal 1 already knows. The transmission request message may be a message that is generated in a physical channel. The transmission request message may be transmitted within a shared resource pool that are agreed both by the terminal 1 and the terminal 2. The transmission request message may be transmitted as 1st stage SCI.

At step S907, the terminal 2 may transmit a transmission confirm message to the terminal 1. When receiving the transmission confirm message, the terminal 2 may find a period to receive data based on information included in the message. The terminal 2 may check a channel status (channel busy ratio (CBR)) of a beam that the terminal 2 will receive, a PSCCH receiving period, and a cyclic transmission period of a synchronization signal block (SSB)/physical broadcast channel (PBCH). After checking and when receiving is possible, the terminal 2 may transmit a transmission confirm message to the terminal 1. The transmission confirm message may include Tx resource information.

At step S911, the terminal 1 may transmit data. As an example, the terminal 1 may send a sidelink control information (SCI) message and transmit data at the same time. The terminal 1 may transmit 2nd stage SCI and PSSCH data at a location of a resource designated by the terminal 2.

Figure 10:
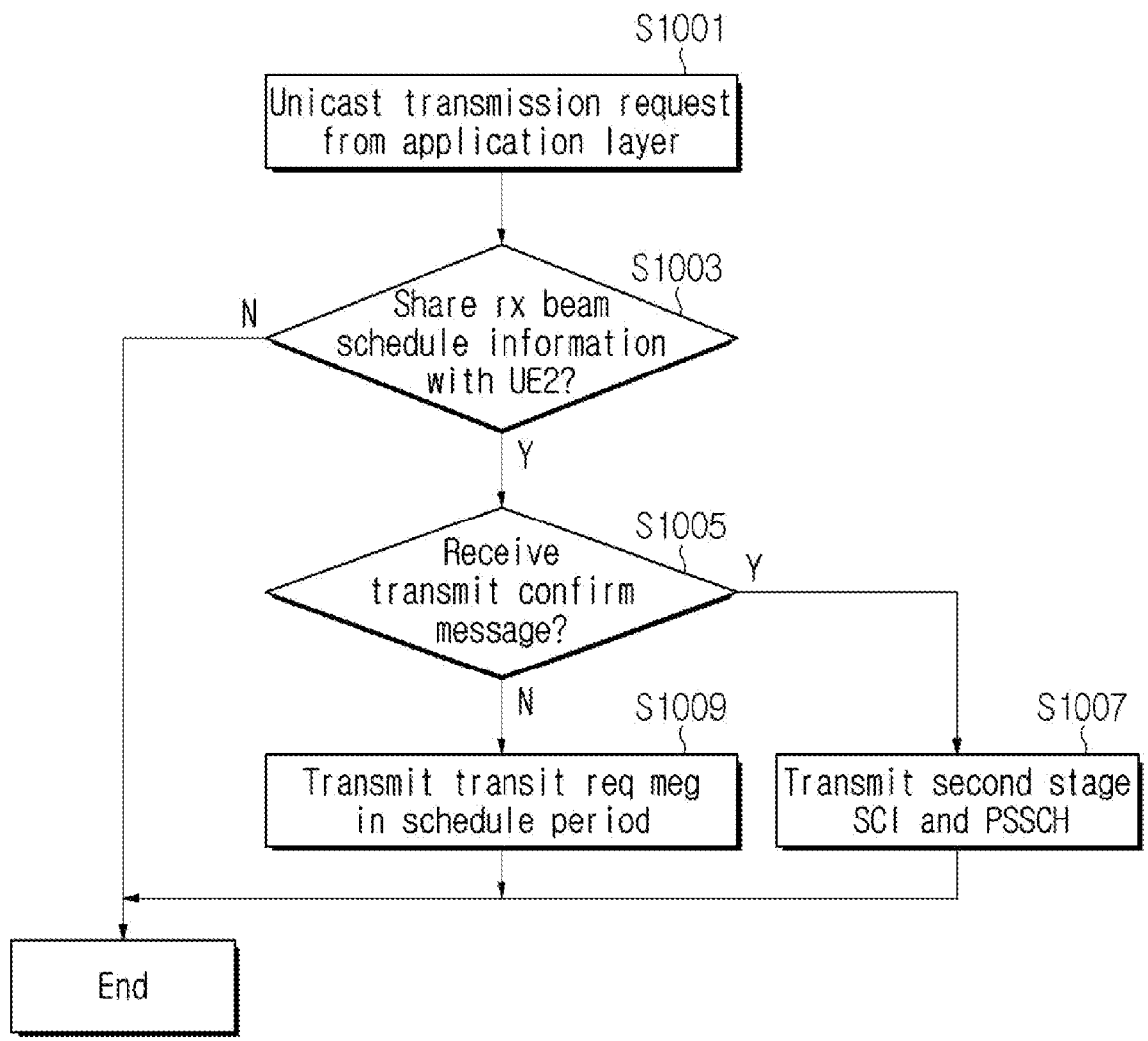
FIG. 10 is a view illustrating an example of a transmission terminal procedure which is applicable to the present disclosure.

FIG. 10 is a view illustrating an example of a transmission terminal procedure which is applicable to the present disclosure. At step S1001, a transmission terminal may check whether or not a unicast request is received from an application layer. At step S1003, after the terminal 1 confirms that a unicast request is received, the terminal 1 may check whether or not Rx beam scheduling information is received from the terminal 2. When the terminal 1 determines that the beam scheduling information is not received, the terminal 1 may perform a sensing window operation that is a normal operation. At step S1005, after the terminal 1 confirms that the Rx beam scheduling information is received, the terminal 1 may check whether or not a transmission confirm message is received. At step S1007, if the terminal 1 receives the transmission confirm message, the terminal 1 may transmit data to the terminal 2. As an example, the terminal 1 may transmit data through second stage SCI and PSSCH. At step S1009, if the terminal 1 does not receive the transmission confirm message, the terminal 1 may transmit a transmission request message to the terminal 2. The terminal 1 may transmit the transmission request message in a scheduling period. Accordingly, retransmission may be possible when the terminal 1 cannot receive the transmission confirm message in a certain environment after initial transmission. The transmit request message may include a time resource, a frequency resource, a Tx data size, a RSRP measurement value per subchannel of an aligned beam, a beam direction, and lane information.

Figure 11:
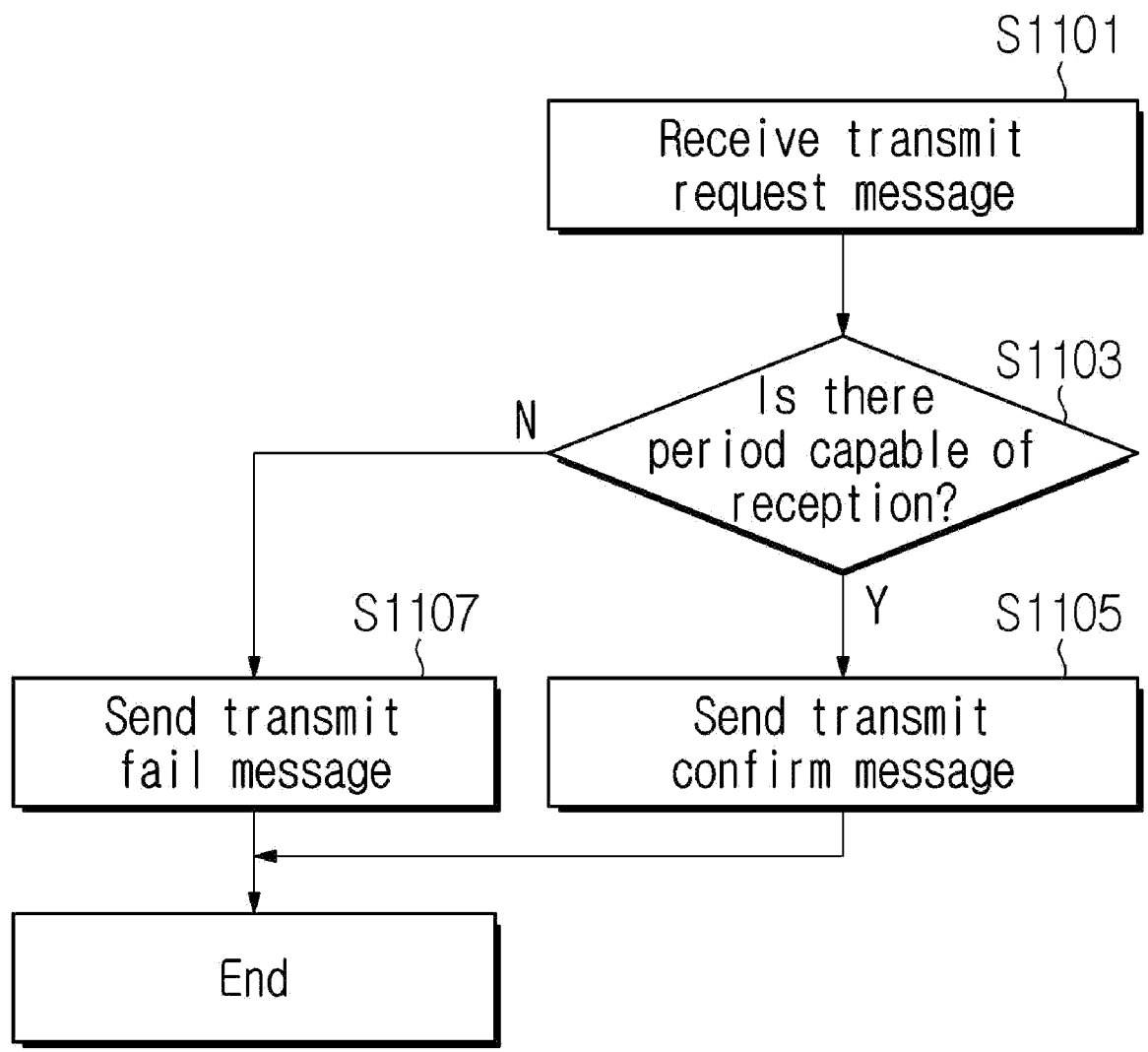
FIG. 11 is a view illustrating an example of a receiving terminal procedure which is applicable to the present disclosure

FIG. 11 is a view illustrating an example of a receiving terminal procedure which is applicable to the present disclosure at step S1101, a receiving terminal may receive a transmission request message. At step S1103, after receiving the transmission request message, the receiving terminal may find resource pool information, which can be received, based on the received message. As an example, the receiving terminal may find the resource pool information, which can be received, within a transmission resource pool of the transmission terminal. As another example, since the receiving terminal can know transmission (Tx) resource pool information of the transmission terminal through the receiving resource pool information, the receiving terminal may find a suitable resource in the transmission resource pool of the transmission terminal. As another example, the receiving terminal may find an optimal subchannel in a receiving period that is shared in a beam alignment procedure. By using contents of the request message, the receiving terminal may find an optimal subchannel in a receiving channel that is shared in a beam alignment procedure. As an example, the receiving terminal may find an optimal subchannel by using a transmission data size, a RSRP value per subchannel, a RSRP value measured in the receiving terminal, and the like. When the receiving terminal fails to find an optimal subchannel, a resource receiving period may be determined through a reservation operation so as to receive in a next data receiving period. At step S1105, the receiving terminal, which has found a period capable of receiving, may transmit a transmission confirm message. At step S1107, when failing to find a period capable of receiving, the receiving terminal may transmit a transmit fail message.

Figure 12A:
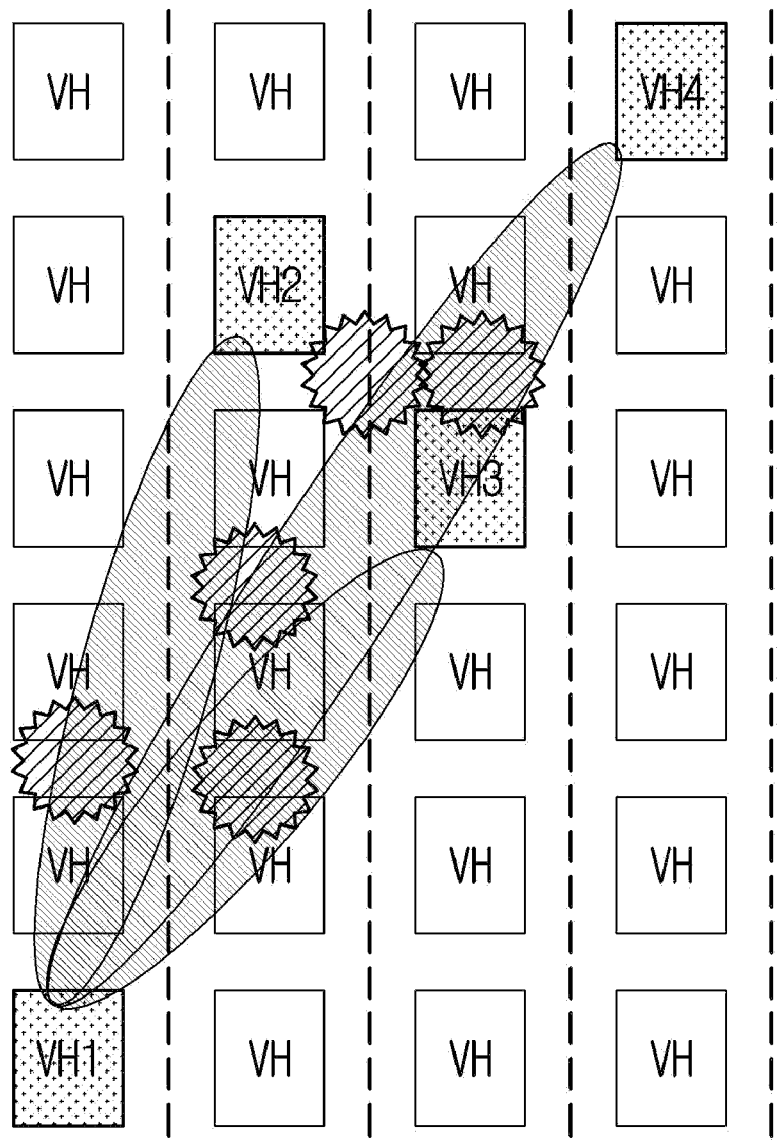
FIG. 12A to FIG. 12E illustrate examples of a method of allocating a resource, which are applicable to the present disclosure.

FIG. 12A to FIG. 12E illustrate examples of a method of allocating a resource, which are applicable to the present disclosure. Referring to FIG. 12A, it is assumed that VH1 is connected with VH2, VH3 and VH4. When unicast is performed with VH1 and VH3, interference may occur to some nodes of VH2. The present disclosure proposes a solution to this problem.

Figure 12B:
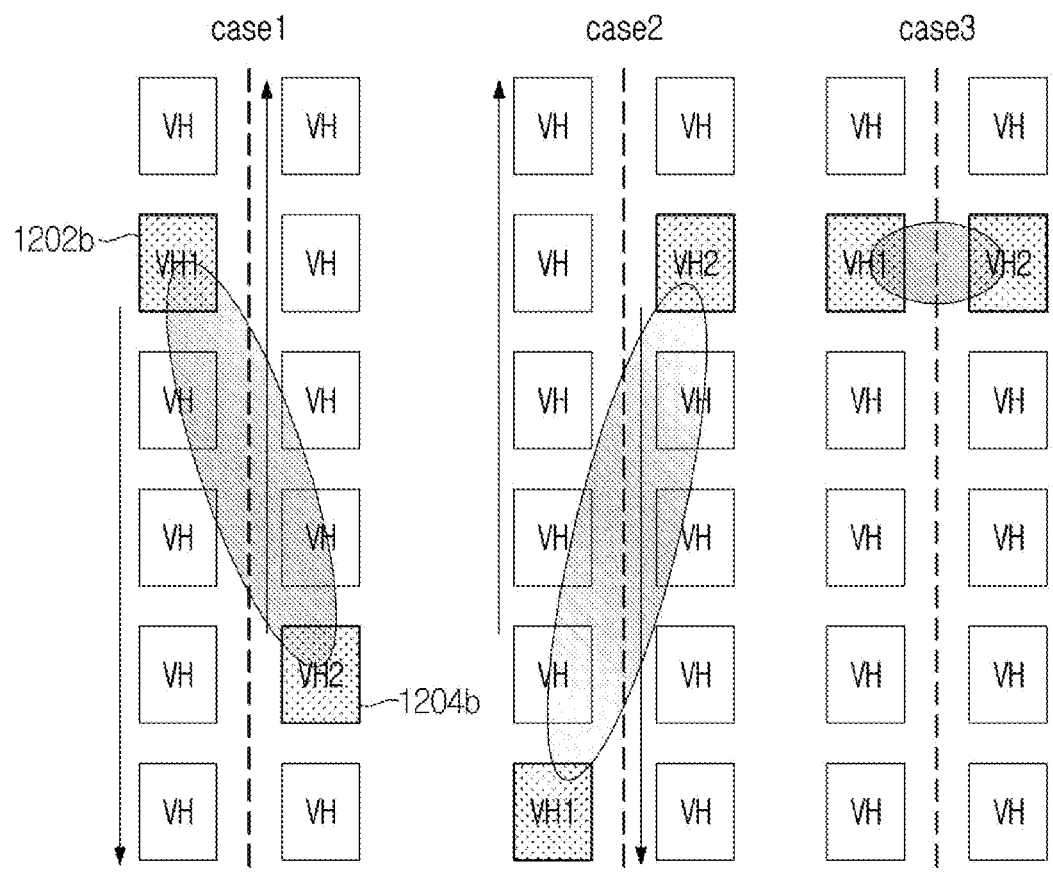

FIG. 12B shows 3 cases in which there is no group between a platoon group and another platoon group. Referring to Case 1 of FIG. 12B, a leader node of the platoon group on the left lane is VH1 1202b. The leader node VH1 may have vehicles belonging to its lane as platoon group nodes. VH2 1204b on the right lane of Case 1 plays the leader node role. VH2 may have vehicles of its lane as nodes of the group. Depending on the locations of the leader nodes in the two lanes, interference may occur between group nodes. As an example, referring to Case 1, it is assumed that VH1 1202b transmits data towards VH2 1204b. In addition, it is also assumed that nodes in the platoon group to which VH2 belongs are performing transmission and receiving. In this case, nodes in the platoon group to which VH2 belongs may undergo interference due to a signal transmitted by VH1. Interference may also occur to Case 2. In Case 3, since there is no node between VH1 and VH2, interference may not occur. In Case 1 and Case 2, the directions indicated by the arrows may indicate group nodes that may be influenced by the leader nodes. In Case 3, there is a high probability that the group nodes are not influenced. Considering these points, the present disclosure proposes a procedure.

Figure 12C:
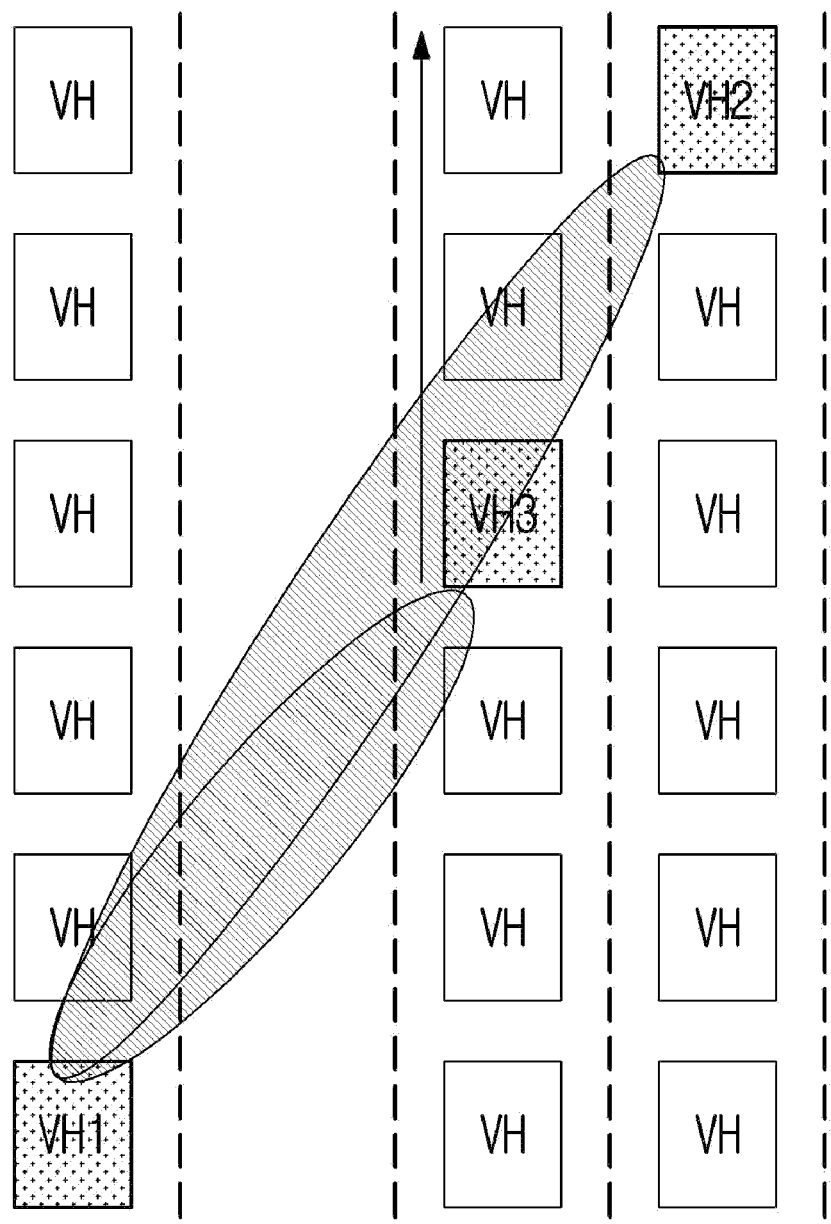
Figure 12D:
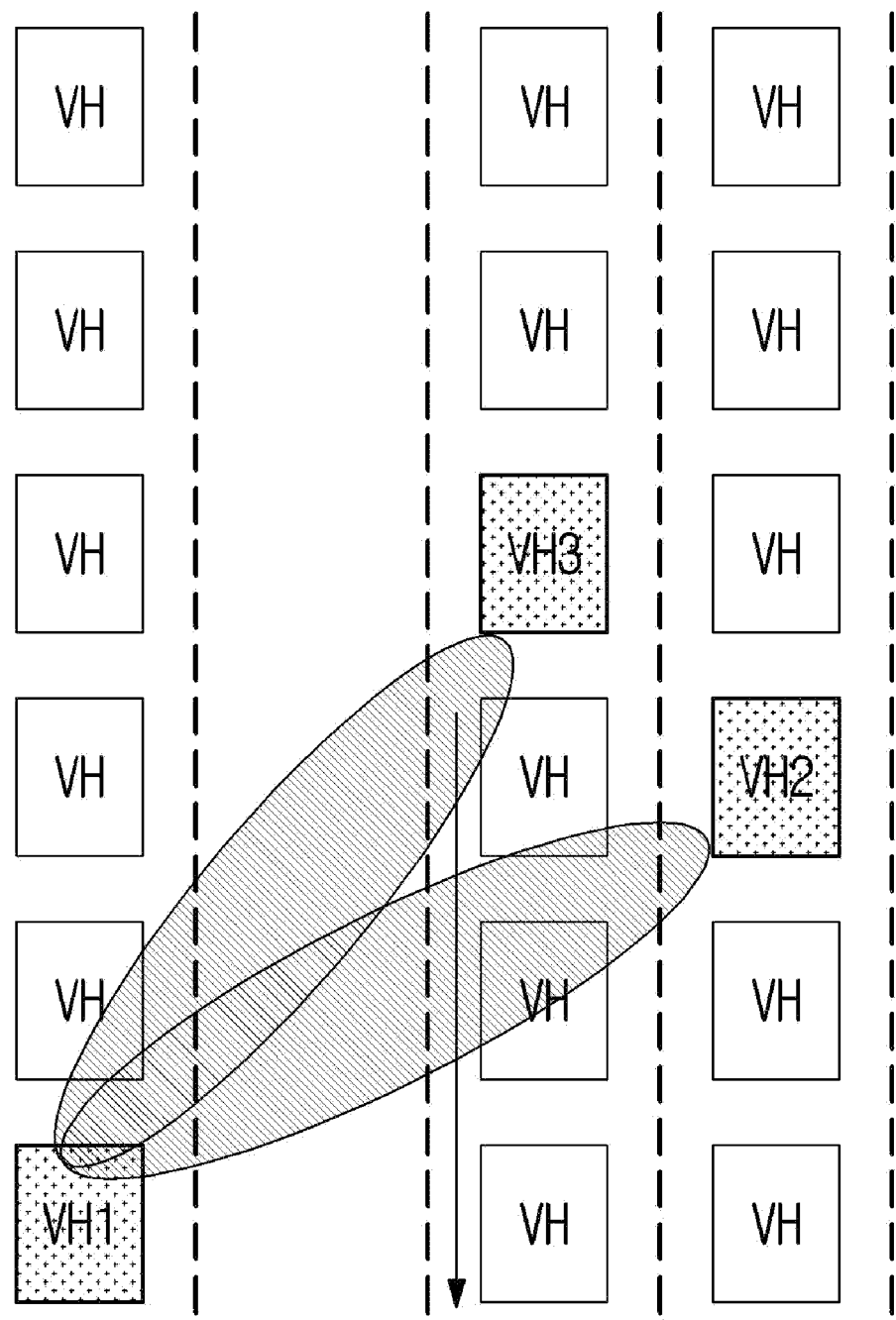

FIG. 12C and FIG. 12D are views showing cases in which there is a group between a platoon group and another platoon group. Interference may occur to communication between nodes within a platoon group in between. Referring to FIG. 12C, VH1, VH2 and VH3 may be leader nodes in respective lanes. Referring to FIG. 12C, communication with VH1 and VH2 may cause interference in communication between nodes of a platoon group to which VH3 belongs. Referring to FIG. 12D, communication with VH1 and VH2 may cause interference in communication between nodes of a platoon group to which VH3 belongs. However, referring to FIG. 12D, a platoon group on an outermost lane may hardly be subject to interference.

Figure 12E:
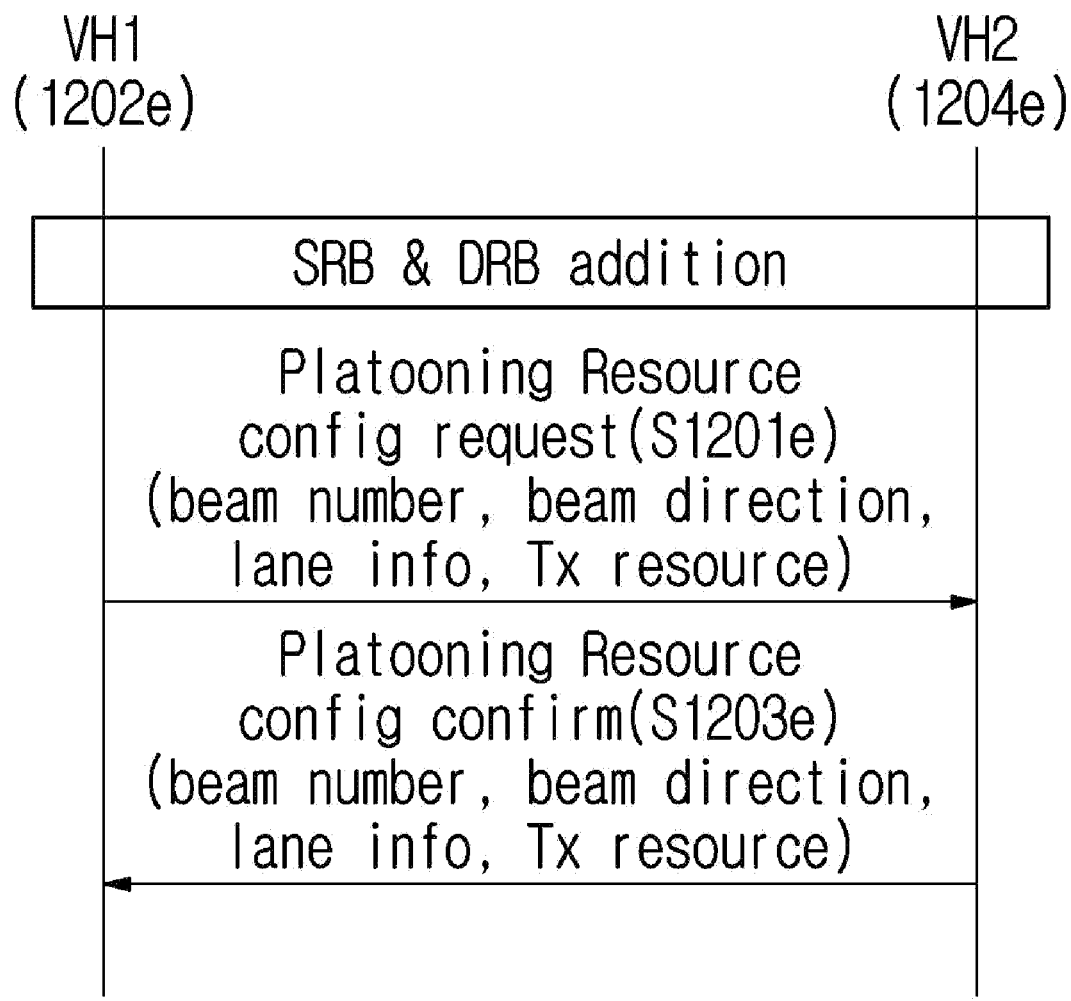

FIG. 12E illustrates an example of a procedure for a case in which there is no group between a platoon group and another platoon group. FIG. 12F is a view illustrating an example of a beam direction of a leader node of a platoon group. Referring to FIG. 12E, at step S1201e, the leader node VH1 may transmit a platooning resource configuration request message based on a node that delivers DRB. As an example, the leader VH1 may transmit a platooning resource configuration request message to the leader node VH2. The platooning resource configuration request message may include a beam number, a beam direction, lane information, a Tx resource and the like. The beam number may include Tx beam number information. The beam direction may include a Tx beam direction. The lane information may include lane information of a node. The Tx resource may include Tx resource information between leader nodes. VH2 may transmit a platooning resource configuration response message to VH1. The platooning resource configuration response message may include a beam number, a beam direction, lane information, a Tx resource and the like.

When receiving the message, the node VH2 may determine based on the Tx beam number and the Tx beam direction. Hereinafter, a determining method of a leader node according to a beam direction will be described. As shown in FIG. 12F, 8 beam directions may be specified. Directions may be various and are not limited to the above-described embodiment. Referring to FIG. 12F, it is assumed that there is no other platoon group between VH1 and VH2. When a beam direction of a leader node is set to 5 or 7, the leader node may determine that there is no influence of interference. Based on the determination that there is no influence of interference, the leader node may not control a resource of nodes of a platoon group. When a beam direction of a leader node is set to 1 or 4, the leader node may determine that a node below the leader node is a potential node to which interference may occur. Based on the determination, when there is an overlapping resource due to a Tx resource that is additionally received, the leader node may not allow the overlapping resource to be used. When a beam direction of a leader node is set to 2 or 4, the leader node may determine that a node above the leader node is a potential node to which interference may occur. When there is an overlapping resource due to a Tx resource that is additionally received, the leader node may control the potential node not to use such a resource. As described above, the leader node VH2, which receives the platooning resource configuration request message, may determine based on a beam direction. At step S1203e, VH2 may transmit a platooning resource configuration confirm message to VH1. The platooning resource configuration confirm message may include a beam number, a beam direction, lane information, and Tx resource information. The beam number may include Tx beam number information. Tx beam number information may be removed when performance update is not possible. The beam direction may include Tx beam direction information. The lane information may include information on a lane in which a corresponding node is located. The Tx resource information may include information on a resource that is transmitted between leader nodes.

Figure 13A:
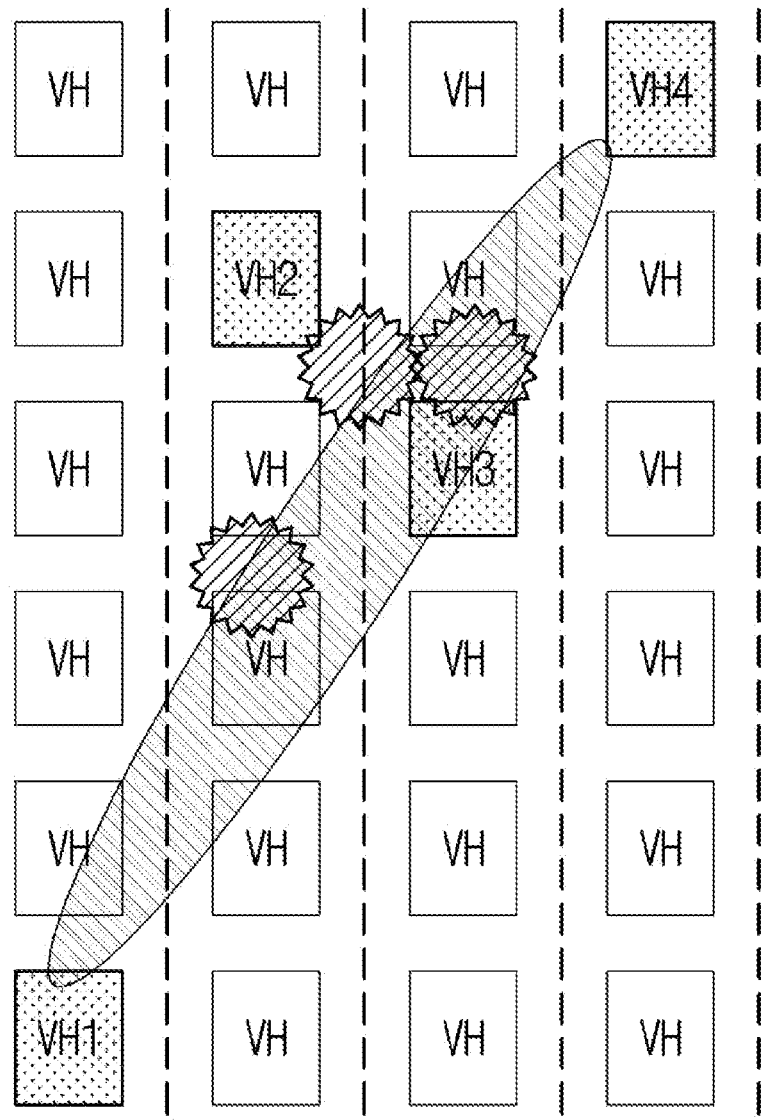
FIG. 13A to FIG. 13C illustrate an example of a method of allocating a resource, when there is a group between a platoon group and a platoon group.
Figure 13B:
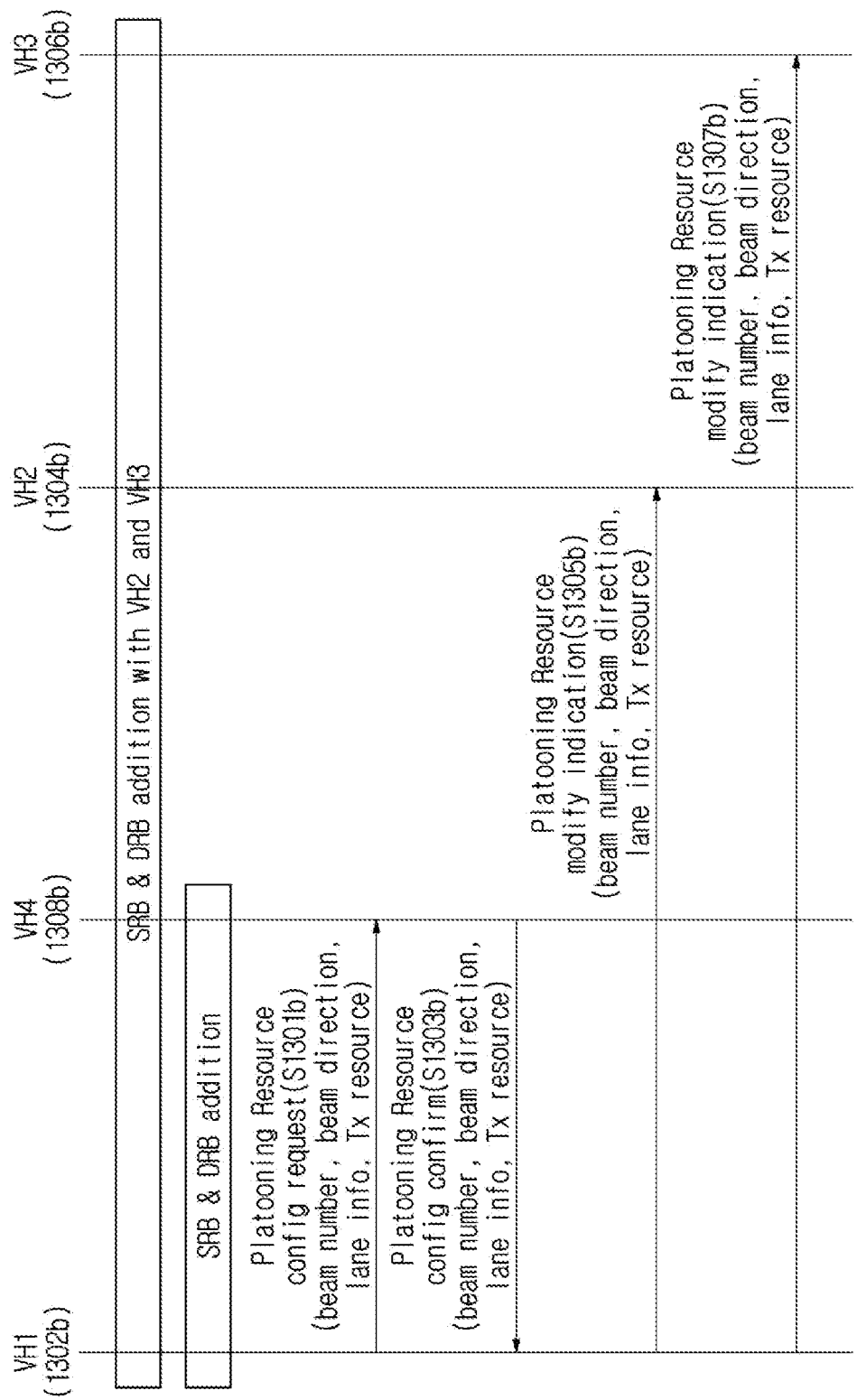
Figure 13C:
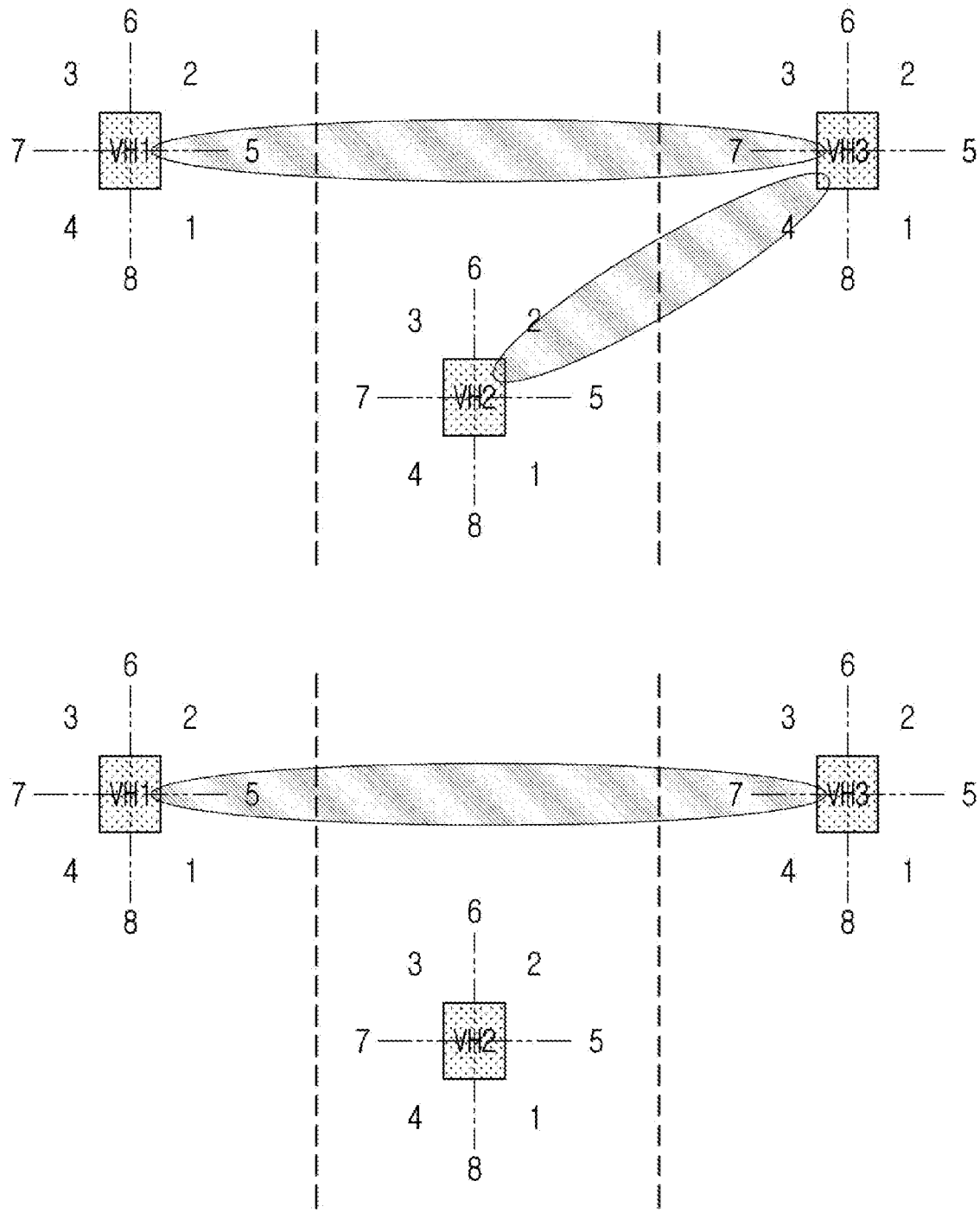

FIG. 13A to FIG. 13C illustrate an example of a method of allocating a resource, when there is a group between a platoon group and a platoon group. Referring to FIG. 13A, a platoon group is present in each lane. VH1 1302b, VH2 1304b, VH3 1306b, and VH4 1308b may be a leader node of each platoon group. Referring to FIG. 13A, there are 2 platoon groups between a platoon group, to which VH1 belongs, and a platoon group to which VH4 belongs. FIG. 13B illustrates an example of a resource allocation procedure for a case in which there is a node in between. As shown in FIG. 13A, it is assumed that, after VH1 and VH4 perform DRB addition, a resource for transmitting data is allocated. The steps S1301b and S1303b are identical with the steps S1201e and S1203e respectively.

At step S1305b, VH1 may transmit a platooning resource modify request message to VH2 that is already connected. At step S1307b, VH1 may transmit a platooning resource modify request message to VH3 that is already connected. The platooning resource modify request message may include a beam number, a beam direction, lane information, and Tx resource information. The platooning resource modify request message may include the number of Tx beams directed to VH4, a direction of a Tx beam directed to VH4, lane information of VH4, and Tx resource information between VH1 and VH4.

Referring to the upper part of FIG. 13C, it is assumed that VH2 receives the platooning resource modify request message. In case VH2 is connected with VH3, VH2 may know a direction of a Tx beam connecting VH1 and VH3 based on the message received from VH1. Accordingly, based on the beam direction information in the resource modify request message, a receiving node may know which node in a platoon group is influenced by interference.

As an example, when a Tx beam of VH1 is directed downwards and a Tx beam of VH2 is directed upwards, VH2 may determine that an upper node can be subject to interference. When a Tx beam direction of VH1 is 1 or 4 and a Tx beam direction of VH2 is 2, 3 or 6, VH2 may determine that an upper node can be subject to interference.

As another example, when a Tx beam of VH2 is directed downwards, VH2 may determine that a lower node can be subject to interference. When a Tx beam direction of VH2 is 1, 4 or 8, VH2 may determine that a lower node can be subject to interference.

Referring to the lower part of FIG. 13C, VH2 and VH3 have not aligned a beam. Accordingly, VH2 may not know which node is subject to interference. According to an example, when VH2 cannot know which node is subject to interference, it may be determined that all the nodes of a platoon group are subject to interference.

Figure 14:
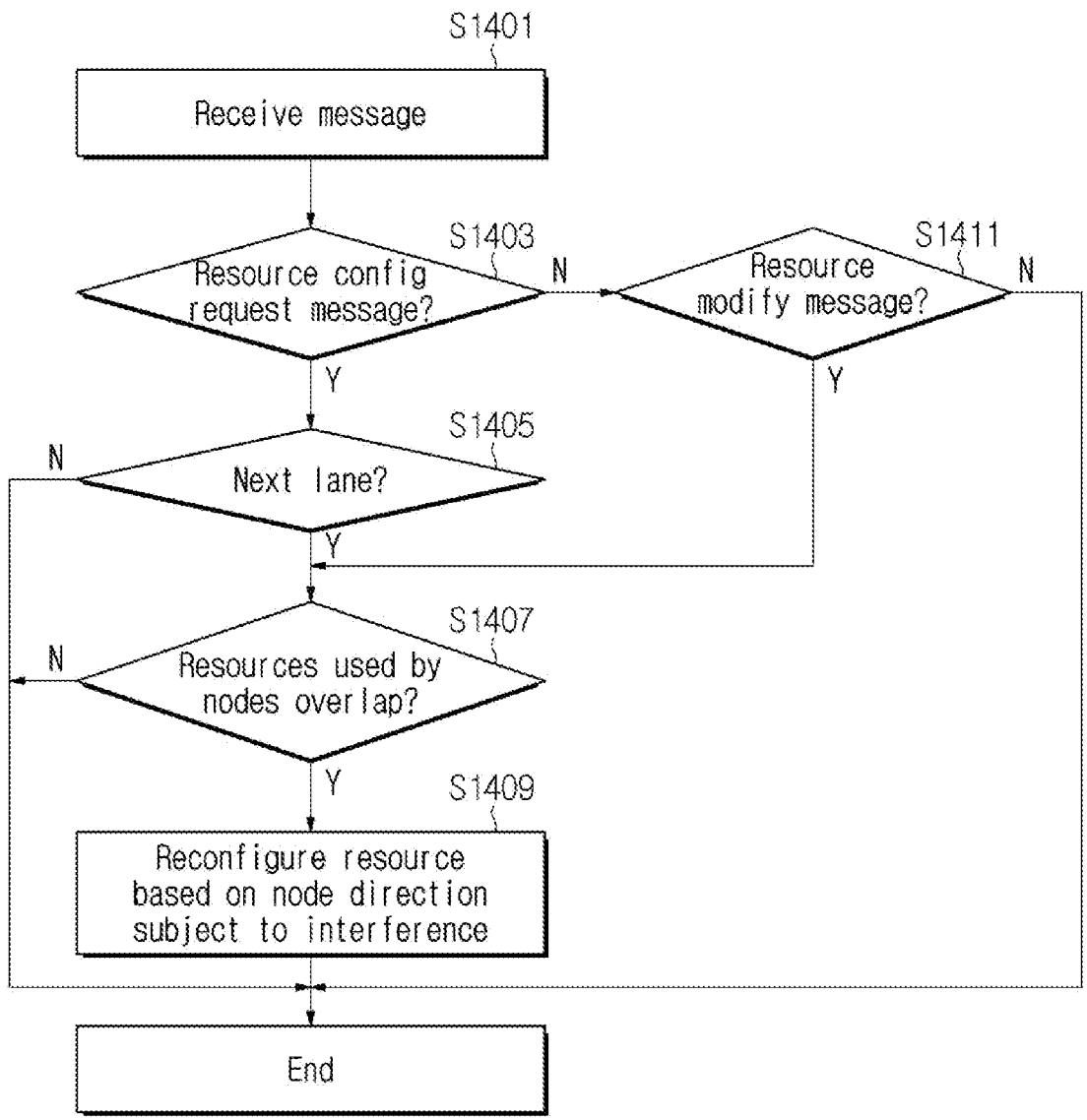
FIG. 14 illustrates an example of a receiving node procedure that is applicable to the present disclosure.

FIG. 14 illustrates an example of a receiving node procedure that is applicable to the present disclosure. As step S1401, a receiving node may receive a message. At step S1403, the receiving node may determine whether the message is a resource configuration message or a modify message. At step S1405, the receiving node may confirm lane information, when the received message is a resource configuration message. For example, the receiving node may check, based on the received message, whether or not a lane of a transmission node is next to a lane of the receiving node. At step S1407, when the lane of the transmission node is next to the lane of the receiving node, the receiving node may check whether or not a resource used by nodes of its platoon group overlaps with a resource the transmission node. The receiving node may check whether or not the resource used by the nodes of the platoon group is subject to interference. At step S1409, when the resource used by nodes of its platoon group overlaps with the resource the transmission node, the receiving node may reconfigure a resource in an overlapping direction based on beam direction information. Based on the received beam direction information, the receiving node may reconfigure a resource used by the nodes of its platoon group. At step S1411, when the message received by the receiving node is a resource modify message, the receiving node may check whether or not a resource used by a node in a platoon group overlaps a resource used by the transmission node. In addition, the receiving node may check whether or not the resource used by a node in the platoon group is subject to interference. When the resources overlap, the receiving node may reconfigure a resource of nodes with the overlapping resources based on beam direction information. When the receiving node determines that a node in the platoon group is subject to interference, the receiving node may reconfigure a resource of nodes, which are subject to interference, based on beam direction information.

Figure 15:
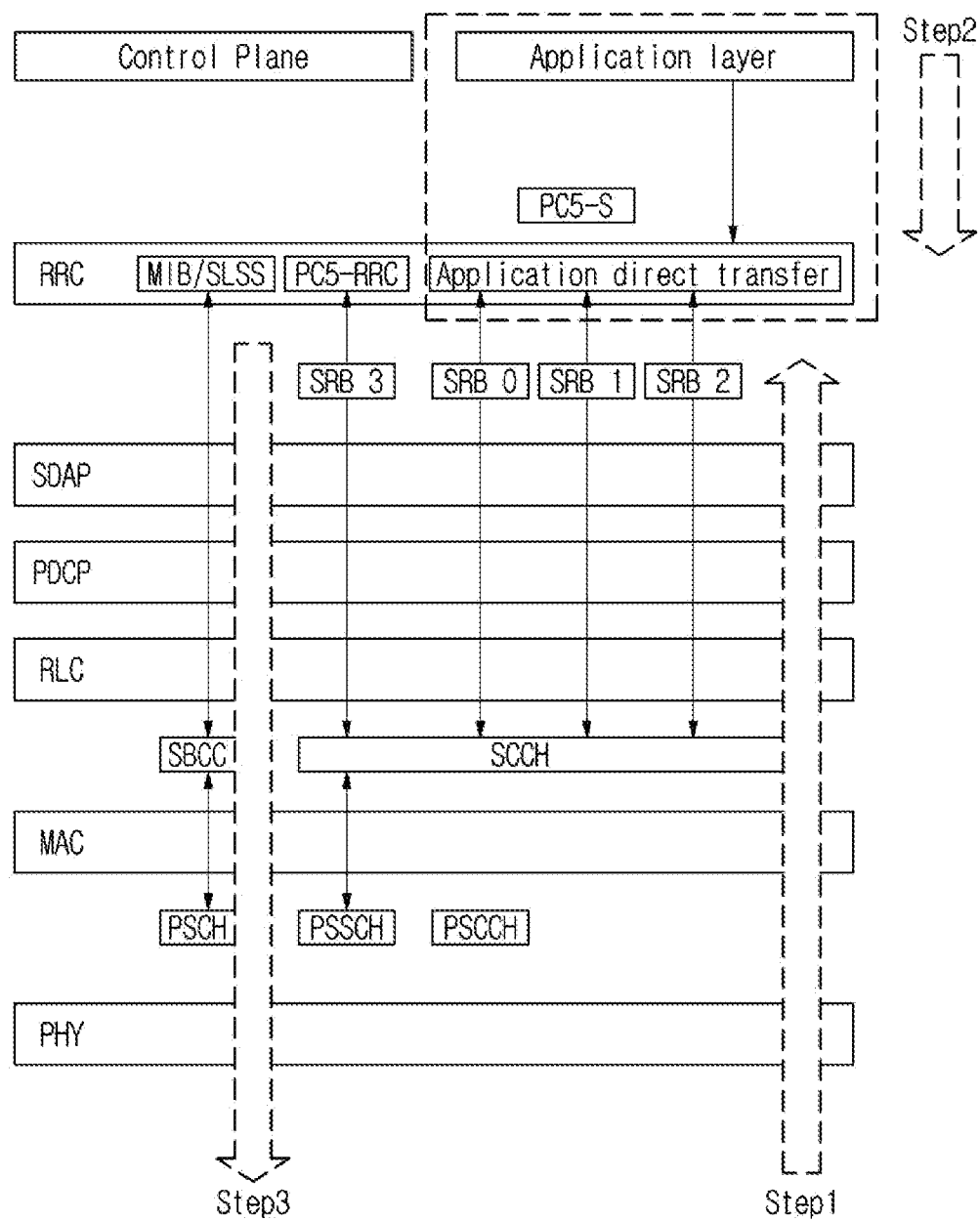
FIG. 15 illustrates an example of a resource allocation procedure, which is applicable to the present disclosure.

FIG. 15 illustrates an example of a resource allocation procedure, which is applicable to the present disclosure. Specifically, FIG. 15 illustrates a resource pool reconfiguration operation procedure for reducing interference based on an application layer. FIG. 15 illustrates a layer of a leader node.

At step S1501, a leader node receives at least one of a platooning resource configuration request message, a platooning resource configuration confirm message, and a platooning resource modify request message. The leader node may receive a message as described above. The leader node may receive the message through at least one of SRB0, SRB1 and SRB2. At step S1503, the leader node may provide a platoon resource control service in an application layer. When the leader node determines that a resource used by a node in a platoon group is likely to subject to interference, the leader node may notify restrict Tx resource pool information to a radio resource control (RRC) layer. At step S1505, the leader node may know the restrict Tx resource pool information in the RRC layer. When the leader node grasps the restrict Tx resource pool information in the RRC layer, the leader node may execute a procedure for resource restriction on a node of a platoon group in the RRC layer. Such a procedure may be unidirectional. Such a procedure may be defined by a PCT-RRC message.

Figure 16A:
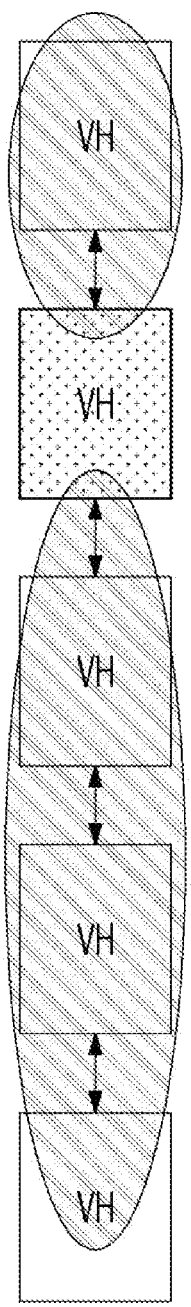
FIG. 16A and FIG. 16B illustrate an example of a resource allocation procedure, which is applicable to the present disclosure.
Figure 16B:
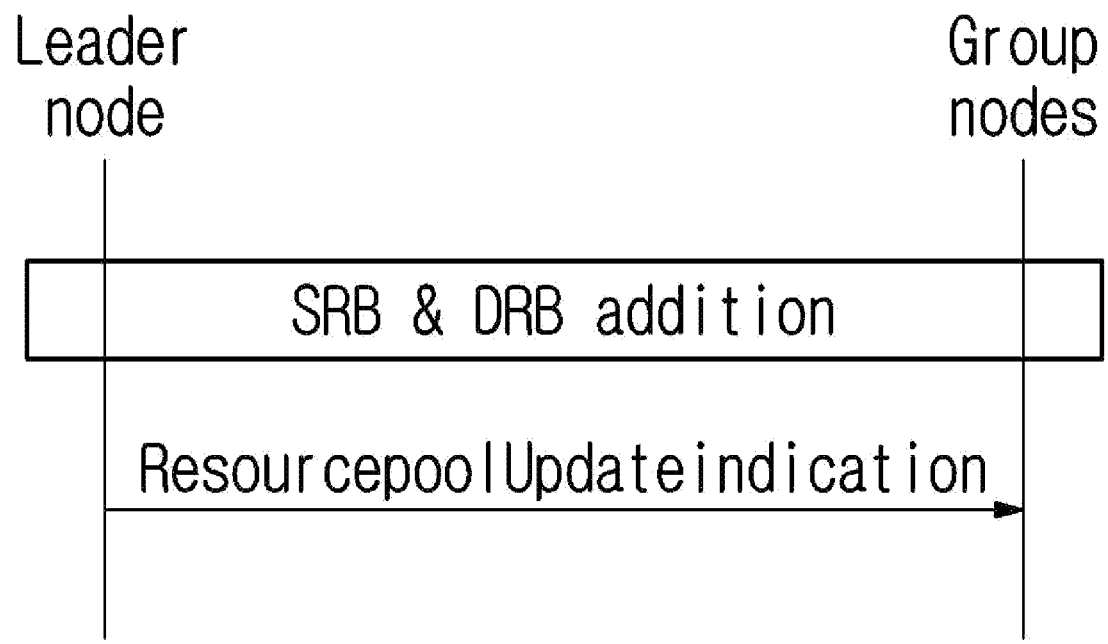

FIG. 16A and FIG. 16B illustrate an example of a resource allocation procedure, which is applicable to the present disclosure. A leader node may be initially attached for communicating with nodes in a platoon group. A leader node may operate resource restriction either in a groupcast scheme or in a unicast scheme. A leader node may transmit a resource pool update indication message to single group nodes or multiple group nodes. The resource pool update indication message may be defined as restriction Tx resource pool information. A node, which receives the message, may update resource pool information. The node, which receives the message, may not use resource restriction.

Figure 17:
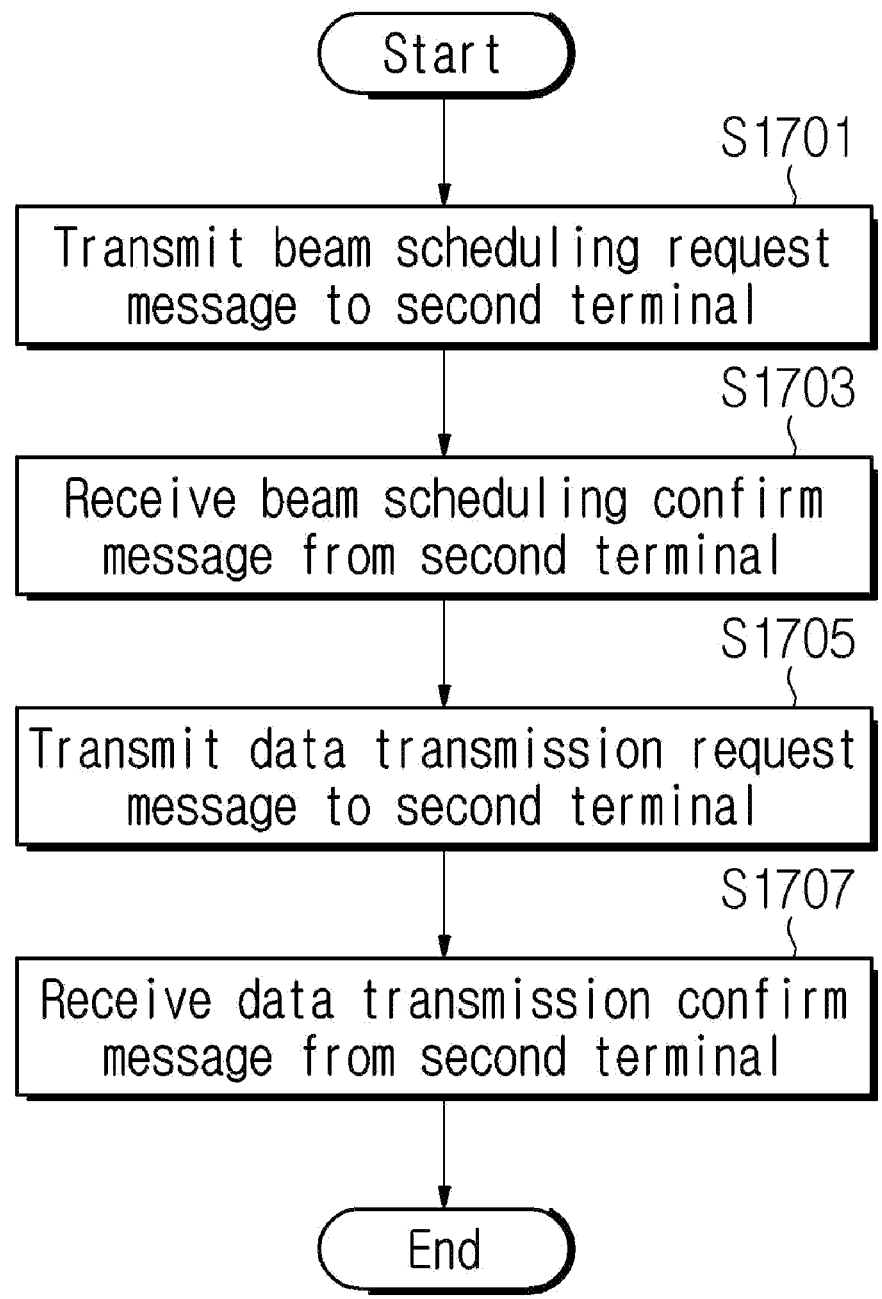
FIG. 17 is a view illustrating an example of a resource allocation procedure, which is applicable to the present disclosure.

FIG. 17 is a view illustrating an example of a resource allocation procedure, which is applicable to the present disclosure. A first terminal may inform a second terminal of a time in which it can receive data per beam. A time for receiving data may be added at an SRB and DRB addition stage. Hereinafter, the Rx beam scheduling stage will be described. The Rx beam scheduling stage may include an operation of notifying a time in which a terminal can receive data per beam.

At step S1701, the first terminal may transmit a beam scheduling request message to the second terminal. The first terminal may be a transmission terminal. The second terminal may be a receiving terminal. The first terminal may transmit a Rx beam schedule request message to the second terminal. As an example, the first terminal may transmit a sidelink synchronization signal (SLSS) and a master information block (MIB) and send a Rx beam schedule request message to the second terminal. In addition, since the first terminal may receive data from the second terminal later, the first terminal may transmit a Rx beam schedule request including corresponding Rx scheduling information to the second terminal. The Rx beam scheduling request message may include Tx beam direction information and Rx beam schedule information. In addition, the Rx beam scheduling request message may include lane information. The Tx beam direction information may be direction information of a beam to be transmitted. As an example, the Tx beam direction information may include information on 8 directions of a beam to be transmitted. Beam directions may be various and are not limited to the above-described embodiment. The lane information may include information on a lane where a transmission terminal is currently located.

The Rx beam schedule information may include Rx beam schedule information for a plurality of beams. As an example, the Rx beam schedule information may configure 64 beams. That is, the Rx beam schedule information may set schedule information for 64 beams. The Rx beam schedule information may include Rx beam timing, Rx resource pool information. The Rx beam timing information may include information on timing for a transmission terminal to receive data later. The Rx beam resource pool information may include information on a resource pool in which the transmission terminal may receive data later.

At step S1703, the first terminal may receive a Rx beam schedule confirm message from the second terminal. The second terminal may transmit its information to the first terminal. Contents of the Rx beam schedule confirm message may be identical with the Rx beam schedule request message. That is, the Rx beam schedule confirm message may include Tx beam direction information and Rx beam schedule information of the second terminal. In addition, the Rx beam scheduling confirm message may include lane information of the second terminal. The second terminal may configure its Rx beam timing and its Rx resource pool information not to overlap with information included in the request message received from the first terminal. As an example, the second terminal may configure its Rx beam timing to be different from the Rx beam timing of the first terminal, which is received from the first terminal. As an example, the second terminal may configure its Rx resource pool to be different from the Rx resource pool of the first terminal, which is received from the first terminal. Through the above-described procedure, the terminal 1 and the terminal 2 may know each other's information. The Rx beam scheduling request message and the Rx beam scheduling confirm message may be transmitted in a physical sidelink control channel (PSCCH) and in a physical sidelink shared channel (PSSCH). PSCCH and PSSCH transmissions may be performed in a same slot.

Hereinafter, the data transmission stage will be described. At step S1705, the first terminal may transmit a transmit request message to the second terminal. As an example, the first terminal may transmit the transmit request message to the second terminal in a sensing window period in order to transmit data. The transmit request message may include a time resource, a frequency resource, a Tx data size, a RSRP measurement value per subchannel of an aligned beam, a beam direction, and lane information. The time resource may include slot information. Time resource information may include time information for a period in which a confirm message may be received. The frequency resource information may include subchannel information. The frequency resource information may include frequency information for a confirm message receiving period. A transmission request message may be transmitted based on the Rx beam timing of the second terminal, which the first terminal already knows. As an example, the transmission request message may be transmitted through PSCCH based on the Rx beam timing of the second terminal, which the first terminal knows. The transmission request message may be a message that is generated in a physical channel. The transmission request message may be transmitted within a shared resource pool that are agreed both by the first terminal and the second terminal. The transmission request message may be transmitted as 1st stage SCI.

At step S1707, the first terminal may receive a transmission confirm message from the second terminal. When receiving the transmission request message, the second message may inform the first terminal of a resource that the second terminal wants to receive. The second terminal may find a period to receive data based on information included in the transmission request message. The second terminal may check a channel status (constant bitrate (CBR)) of a beam that the second terminal will receive, a PSCCH receiving period, and a cyclic transmission period of a synchronization signal block (SSB)/physical broadcast channel (PBCH). After checking and when receiving is possible, the second terminal may transmit a transmission confirm message to the first terminal. The transmission confirm message may include Tx resource information. The first terminal may transmit data based on the transmission confirm message. As an example, the first terminal may transmit data to the second terminal based on Tx resource pool information included in the transmission confirm message. As another example, the first terminal may send a sidelink control information (SCI) message and transmit data at the same time. The first terminal may transmit 2nd stage SCI and PSSCH data at a location of a resource designated by the second terminal.

The first terminal may check whether or not a unicast request is received from an application layer. After the first terminal confirms that a unicast request is received, the first terminal may check whether or not Rx beam scheduling information is received from the second terminal. When the first terminal determines that the beam scheduling information is not received, the first terminal may perform a sensing window operation that is a normal operation. After the first terminal confirms that the Rx beam scheduling information is received, the terminal 1 may check whether or not a transmission confirm message is received. If the first terminal receives the transmission confirm message, the first terminal may transmit data to the second terminal. As an example, the first terminal may transmit data through second stage SCI and PSSCH. If the first terminal does not receive the transmission confirm message, the first terminal may transmit a transmission request message to the second terminal. Accordingly, retransmission may be possible when the terminal 1 cannot receive the transmission confirm message in a certain environment after initial transmission. The first terminal may transmit the transmission request message in a scheduling period. The first terminal may transmit the transmission request message based on scheduling information that is already agreed with the second terminal.

Figure 18:
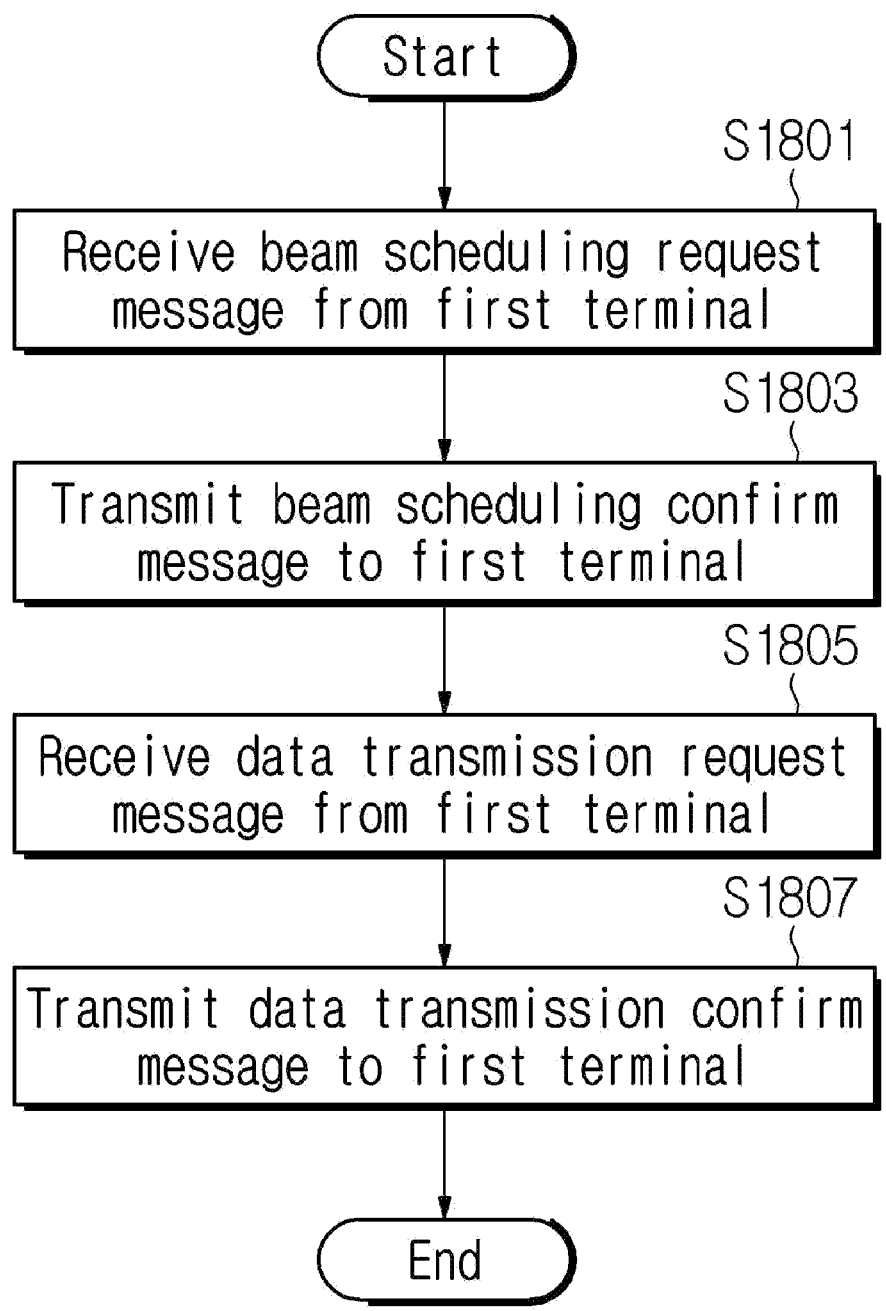
FIG. 18 is a view illustrating an example of a resource allocation procedure, which is applicable to the present disclosure.

FIG. 18 is a view illustrating an example of a resource allocation procedure, which is applicable to the present disclosure. A first terminal may be a transmission terminal. A second terminal may be a receiving terminal. At step S1801, the second terminal may receive a beam scheduling request message from the first terminal. The Rx beam scheduling request message may include Tx beam direction information and Rx beam schedule information. In addition, the Rx beam scheduling request message may include lane information. The Tx beam direction information may be direction information of a beam to be transmitted. As an example, the Tx beam direction information may include information on 8 directions of a beam to be transmitted. Beam directions may be various and are not limited to the above-described embodiment. The lane information may include information on a lane where a transmission terminal is currently located.

The Rx beam schedule information may include Rx beam schedule information for a plurality of beams. As an example, the Rx beam schedule information may configure 64 beams. That is, the Rx beam schedule information may set schedule information for 64 beams. The Rx beam schedule information may include Rx beam timing, Rx resource pool information. The Rx beam timing information may include information on timing for a transmission terminal to receive data later. The Rx beam resource pool information may include information on a resource pool in which the transmission terminal may receive data later.

At step S1803, the second terminal may transmit a beam scheduling confirm message to the first terminal. Contents of the Rx beam schedule confirm message may be identical with the Rx beam schedule request message. That is, the Rx beam schedule confirm message may include Tx beam direction information and Rx beam schedule information of the second terminal. In addition, the Rx beam scheduling confirm message may include lane information of the second terminal. The second terminal may configure its Rx beam timing and its Rx resource pool information not to overlap with information included in the request message received from the first terminal. As an example, the second terminal may configure its Rx beam timing to be different from the Rx beam timing of the first terminal, which is received from the first terminal. As an example, the second terminal may configure its Rx resource pool to be different from the Rx resource pool of the first terminal, which is received from the first terminal. Through the above-described procedure, the terminal 1 and the terminal 2 may know each other's information. The Rx beam scheduling request message and the Rx beam scheduling confirm message may be transmitted in a physical sidelink control channel (PSCCH) and in a physical sidelink shared channel (PSSCH). PSCCH and PSSCH transmissions may be performed in a same slot.

At step S1805, the second terminal may receive the data transmission request message from the first terminal. The second terminal may find a period to receive data based on information included in the message. The second terminal may check a channel status (constant bitrate (CBR)) of a beam that the second terminal will receive, a PSCCH receiving period, and a cyclic transmission period of a synchronization signal block (SSB)/physical broadcast channel PP2H).

After receiving the transmission request message, the second terminal may find resource pool information, which can be received, based on the received message. As an example, the second terminal may find the resource pool information, which can be received, within a transmission resource pool of the first terminal. As another example, since the second terminal can know transmission resource pool information of the first terminal through the receiving resource pool information, the second terminal may find a suitable resource in the transmission resource pool of the first terminal. As another example, the second terminal may find an optimal subchannel in a receiving period that is shared in a beam alignment procedure. By using contents of the request message, the second terminal may find an optimal subchannel in a receiving channel that is shared in a beam alignment procedure. As an example, the second terminal may find an optimal subchannel by using a transmission data size, a RSRP value per subchannel, a RSRP value measured in the receiving terminal, and the like. When the second terminal fails to find an optimal subchannel, a resource receiving period may be determined through a reservation operation so as to receive in a next data receiving period. When finding a period capable of receiving, the second terminal may transmit the transmission confirm message. When failing to find a period capable of receiving, the second terminal may transmit a transmit fail message.

At step S1807, the second terminal may transmit a data transmission confirm message to the first terminal. After checking the transmission request message and when receiving is possible, the second terminal may transmit a transmission confirm message to the first terminal. The transmission confirm message may include Tx resource information. The first terminal may transmit data based on the transmission confirm message. As an example, the first terminal may transmit data to the second terminal based on Tx resource pool information included in the transmission confirm message. As another example, the first terminal may send a sidelink control information (SCI) message and transmit data at the same time.

Systems and Various Devices to which
Embodiments of the Present Disclosure are
Applicable Various embodiments of the present disclosure may be combined with each other.

Hereinafter, a device will be described to which various embodiments of the present disclosure is applicable. Although not limited thereto, various descriptions, functions, procedures, proposals, methods and/or operation flowcharts disclosed in this document are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Figure 19:
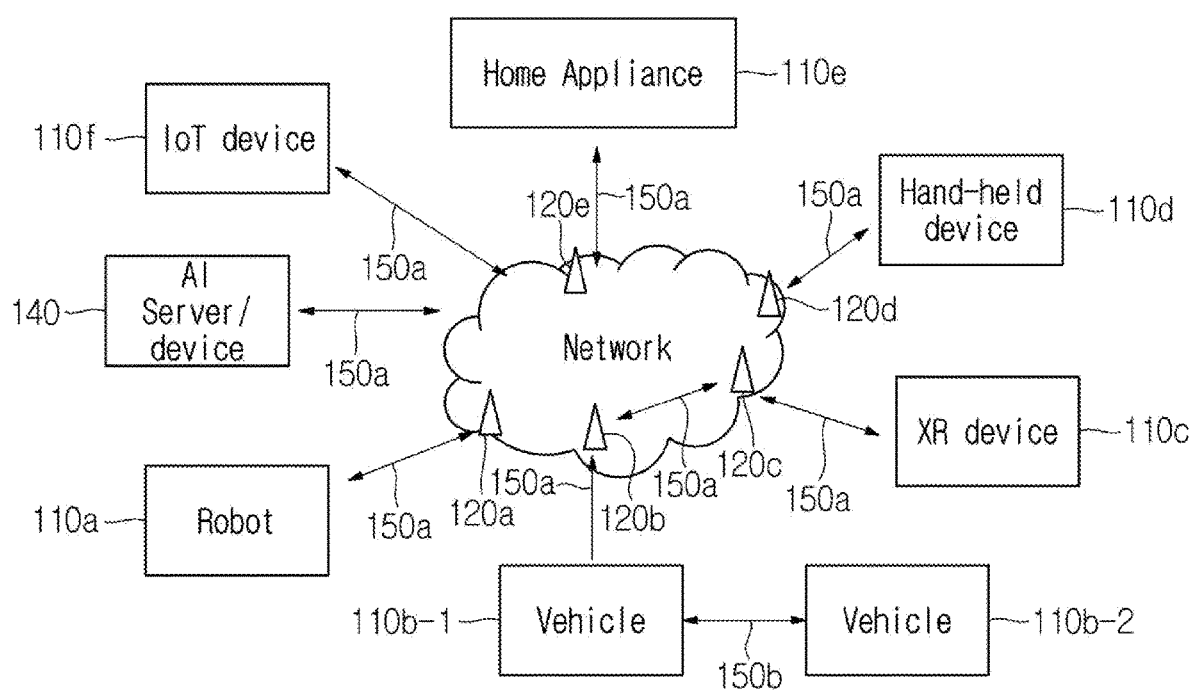
FIG. 19 illustrates an example of a communication system according to an embodiment of the present disclosure.

FIG. 19 illustrates an example of a communication system according to an embodiment of the present disclosure. An embodiment of FIG. 19 may be combined with various embodiments of the present disclosure.

Referring to FIG. 19, a communication system, which is applicable to the present disclosure, includes a wireless device, a base station, and a network. Herein, the wireless device means a device, which performs communication using a radio access technology (e.g., 5G NR, LTE), and may be referred to as communication/radio/5G device. The wireless device may include, without being limited to, at least one of a robot 110*a*, vehicles 110*b*-1 and 110*b*-2, an extended reality (XR) device 110c, a hand-held device 110d, a home appliance 110e, an Internet of Things (IoT) device 110f, and an artificial intelligence (AI) device/server 110g. For example, the vehicles may include a vehicle having a wireless communication function, an autonomous vehicle, and a vehicle capable of performing vehicle-to-vehicle communication. Herein, the vehicles 110b-1 and 110b-2 may include an unmanned aerial vehicle (UAV) (e.g., a drone). The XR device 110c may include an augmented Reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device 110d may include a smartphone, a smartpad, a wearable device (e.g., a smartwatch or a smartglasses), and a computer (e.g., a notebook). The home appliance 110e may include a TV, a refrigerator, and a washing machine. The IoT device 110f may include a sensor and a smartmeter. For example, the base stations 120a to 120e and the network may be implemented as wireless devices and a specific wireless device 120a may operate as a base station/network node with respect to other wireless devices.

Here, wireless communication technology implemented in the wireless devices 110a to 110f of this disclosure may include not only LTE, NR and 6G but also narrowband Internet of things for low-power communication. In this case, for example, NB-IoT technology may be an example of LPWAN (Low Power Wide Area Network) technology and may be implemented in the standard such as LTE Cat NB1 and/or LTE Cat NB2, without being limited to the above-described names. Additionally or alternatively, the wireless communication technology implemented in the wireless devices 100a to 100f of the present specification may perform communication based on the LTE-M technology. In this case, as an example, the LTE-M technology may be an example of an LPWAN technology, and may be called various names such as enhanced machine type communication (eMTC). For example, the LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, without being limited to the above-described names. Additionally or alternatively, the wireless communication technology implemented in the wireless devices 100a to 100f of the present specification may include at least any one of ZigBee, Bluetooth, and Low Power Wide Area Network (LPWAN) in consideration of low power communication, without being limited to the above-described names. For example, the ZigBee technology may create PAN (personal area networks) related to small/low-power digital communication based on various standards such as IEEE 802.15.4, and may be called by various names.

The wireless devices 100a to 100f may be connected to a network via the base stations 120a to 120e. An AI technology may be applied to the wireless devices 100a to 100f, and the wireless devices 100a to 100f may be connected to the AI server 110g via a network. The network may be configured using a 3G network, a 4G (e.g., LTE) network, or a 5G (e.g., NR) network. Although the wireless devices 100a to 100f may communicate with each other through the base stations 120a to 120e/network, the wireless devices 100a to 100f may perform direct communication (e.g., sidelink communication) with each other without the base stations 120a to 120e/network. For example, the vehicles 110b-1 and 110b-2 may perform direct communication (e.g., Vehicle-to-Vehicle (V2V)/Vehicle-to-everything (V2X) communication). In addition, the IoT device 110f (e.g., a sensor) may perform direct communication with other IoT devices (e.g., sensors) or other wireless devices 101a to 110f.

Wireless communication/connections 150a, 150b and 150c may be established between the wireless devices 110a to 110f and the base stations 120a to 120e and between the base stations 120a to 120e and the base stations 120a to 120e. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (JAB)). The wireless devices and the BSs/the wireless devices may transmit/receive radio signals to/from each other through the wireless communication/connections 150a and ?150b. For example, the wireless communication/connections 150a and ?150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
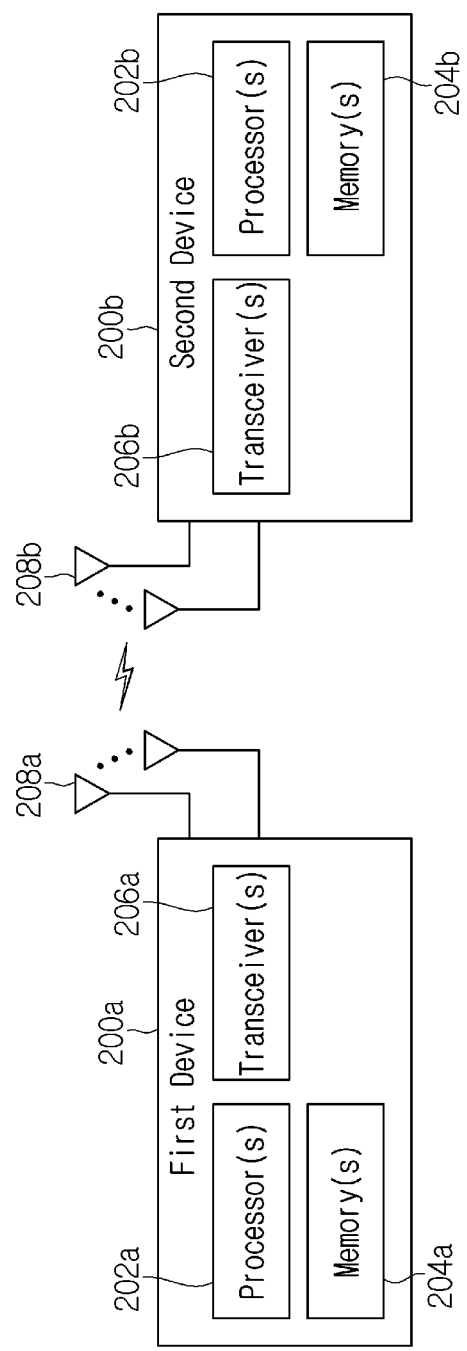
FIG. 20 shows an example of a wireless device according to an embodiment of the present disclosure.

FIG. 20 illustrates an example of a wireless device according to an embodiment of the present disclosure. An embodiment of FIG. 20 may be combined with various embodiments of the present disclosure.

Referring to FIG. 20, a first wireless device 200a and a second wireless device 200b may transmit and receive radio signals through various radio access technologies (e.g., LTE and NR). Herein, {the first wireless device 200a and the second wireless device 200b} may correspond to {the wireless device 110x and the base station 120x} and/or {the wireless device 110x and the wireless device 110x} of FIG. 19.

The first wireless device 200a may include one or more processors 202a and one or more memories 204a and additionally further include one or more transceivers 206a and/or one or more antennas 208a. The processor(s) 202a may control the memory(s) 204a and/or the transceiver(s) 206a and may be configured to implement the descriptions, functions, procedures, proposals, methods, and/or operational flowcharts disclosed in this document. For example, the processor(s) 202a may process information within the memory(s) 204a to generate first information/signals and then transmit radio signals including the first information/signals through the transceiver(s) 206a. In addition, the processor(s) 202a may receive radio signals including second information/signals through the transceiver 206a and then store information obtained by processing the second information/signals in the memory(s) 204a. The memory(s) 204a may be connected to the processor(s) 202a and may store various information related to operations of the processor(s) 202a. For example, the memory(s) 204a may store software code including commands for performing a part or the entirety of processes controlled by the processor(s) 202a or for performing the descriptions, functions, procedures, proposals, methods, and/or operational flowcharts disclosed in this document. Herein, the processor(s) 202a and the memory(s) 204a may be a part of a communication modem/circuit/chip designed to implement RAT (e.g., LTE or NR). The transceiver(s) 206a may be connected to the processor(s) 202a and transmit and/or receive radio signals through one or more antennas 208a. Each of the transceiver(s) 206a may include a transmitter and/or a receiver. The transceiver(s) 206a may be used interchangeably with a radio frequency (RF) unit. In the present disclosure, the wireless device may represent a communication modem/circuit/chip.

As an example, a first wireless device may be a terminal transmitting a discovery signal. The terminal may include a transceiver and a processor coupled with the transceiver. The transceiver receives the location-related information of the terminal, and the processor generates a zone identity (zone ID) based on the location-related information of the terminal and determines discovery slot mapping based on the zone ID, and the transceiver may transmit a discovery signal based on the discovery slot mapping set. The determination of discovery slot mapping based on the zone ID may be generating a shift discovery value based on the zone ID and determining the discovery slot mapping set based on the shift discovery. Receiving the location-related information of the terminal may be receiving the location-related information of the terminal based on a global navigation satellite system (GNSS). The zone ID may be a zone ID having a size of m5. The processor may determine a beam sweep pattern and transmit the discovery signal in consideration of the beam sweep pattern. As an example, determining the beam sweep pattern may include sweeping a first beam group first and, when the discovery fails, sweeping a second beam group. As another example, determining the beam sweep pattern may include adjusting a beam width of the first beam group.

As another example, the first wireless device may be a terminal that receives a discovery signal. The terminal may include a transceiver and a processor coupled with the transceiver. The transceiver may receive information on a location of the terminal. The processor may generate a zone ID (zone identity) based on the information on the location of the terminal. Discovery slot mapping may be determined based on the zone ID. The transceiver may receive a discovery signal based on the discovery slot mapping.

As another example, the first wireless device may be a device including at least one memory and at least one processor functionally coupled with the at least one memory. The at least one processor may control the device to receive information on a location of the device. The at least one processor may control the device to generate a zone ID (zone identity) based on the information on the location of the device. The at least one processor may control the device to determine discovery slot mapping based on the zone ID. The at least one processor may control the device to transmit a discovery signal based on the discovery slot mapping set.

The second wireless device 200b performs wireless communication with the first wireless device 200a, and includes one or more processors 202b and one or more memories 204b and may additionally include one or more transceivers 206b and/or one or more antennas 208b. The functions of the one or more processors 202b, one or more memories 204b, one or more transceivers 206b, and/or one or more antennas 208b are similar to the one or more processors 202a, one or more memories 204a, one or more transceivers 206a and/or one or more antennas 208a of the first wireless device 200a.

Hereinafter, hardware elements of the wireless devices 200a and 200b will be described more specifically. One or more protocol layers may be implemented by, without being limited to, the one or more processors 202a and 202b. For example, the one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). The one or more processors 202a and 202b may generate one or more protocol data units (PDUs), one or more service data units (SDUs), a message, control information, data or information according to the descriptions, functions, procedures, proposals, methods, and/or operational flowcharts disclosed in this document. The one or more processors 202a and 202b may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 206a and 206b. The one or more processors 202a and 202b may receive the signals (e.g., baseband signals) from the one or more transceivers 206a and 206b and acquire the PDUs, SDUs, messages, control information, data, or information according to the descriptions, functions, procedures, proposals, methods, and/or operational flowcharts disclosed in this document.

The one or more processors 202a and 202b may be referred to as controllers, microcontrollers, microprocessors, or microcomputers. The one or more processors 202a and 202b may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 202a and 202b. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 202a and 202b or stored in the one or more memories 204a and 204b so as to be driven by the one or more processors 202a and 202b. The descriptions, functions, procedures, proposals, methods, and/or operational flowcharts disclosed in this document may be implemented using firmware or software in the form of code, commands, and/or a set of commands.

As an example, the first wireless device may be a non-transitory computer-readable medium storing at least one instruction. The computer-readable medium may include the at least one instruction that is executable by a processor. The at least one instruction may instruct the computer-readable medium to receive information on a location of the computer-readable medium. The at least one instruction may instruct the computer-readable medium to generate a zone ID (zone identity) based on the information on the location of the computer-readable medium. The at least one instruction may instruct the computer-readable medium to determine discovery slot mapping based on the zone ID. The at least one instruction may instruct the computer-readable medium to transmit a discovery signal based on the discovery slot mapping.

The one or more memories 204a and 204b may be connected to the one or more processors 202a and 202b and store various types of data, signals, messages, information, programs, code, instructions, and/or commands. The one or more memories 204a and 204b may be configured by a read only memory (ROM), a random access memory (RAM), an erasable programmable read only memory (EPROM), a flash memory, a hard drive, a register, a cash memory, a computer-readable storage media, and/or a combination thereof. The one or more memories 204a and 204b may be located inside and/or outside the one or more processors 202a and 202b. In addition, the one or more memories 204a and 204b may be connected to the one or more processors 202a and 202b through various technologies such as wired or wireless connection.

The one or more transceivers 206a and 206b may transmit user data, control information, and/or radio signals/channels, mentioned in the methods and/or operational flowcharts of this document, to one or more other devices. The one or more transceivers 206a and 206b may receive user data, control information, and/or radio signals/channels, mentioned in the descriptions, functions, procedures, proposals, methods, and/or operational flowcharts disclosed in this document, from one or more other devices. In addition, the one or more transceivers 206a and 206b may be connected to the one or more antennas 208a and 208b, and the one or more transceivers 206a and 206b may be configured to transmit and receive user data, control information, and/or radio signals/channels, mentioned in the descriptions, functions, procedures, proposals, methods, and/or operational flowcharts disclosed in this document, through the one or more antennas 208a and 208b. In this document, the one or more antennas may be a plurality of physical antennas or a plurality of logical antennas (e.g., antenna ports). The one or more transceivers 206a and 206b may convert received radio signals/channels, etc., from RF band signals into baseband signals in order to process received user data, control information, radio signals/channels, etc., using the one or more processors 202a and 202b. The one or more transceivers 206a and 206b may convert the user data, control information, radio signals/channels, etc., processed using the one or more processors 202a and 202b from the base band signals into the RF band signals. To this end, the one or more transceivers 206a and 206b may include (analog) oscillators and/or filters.

Figure 21:
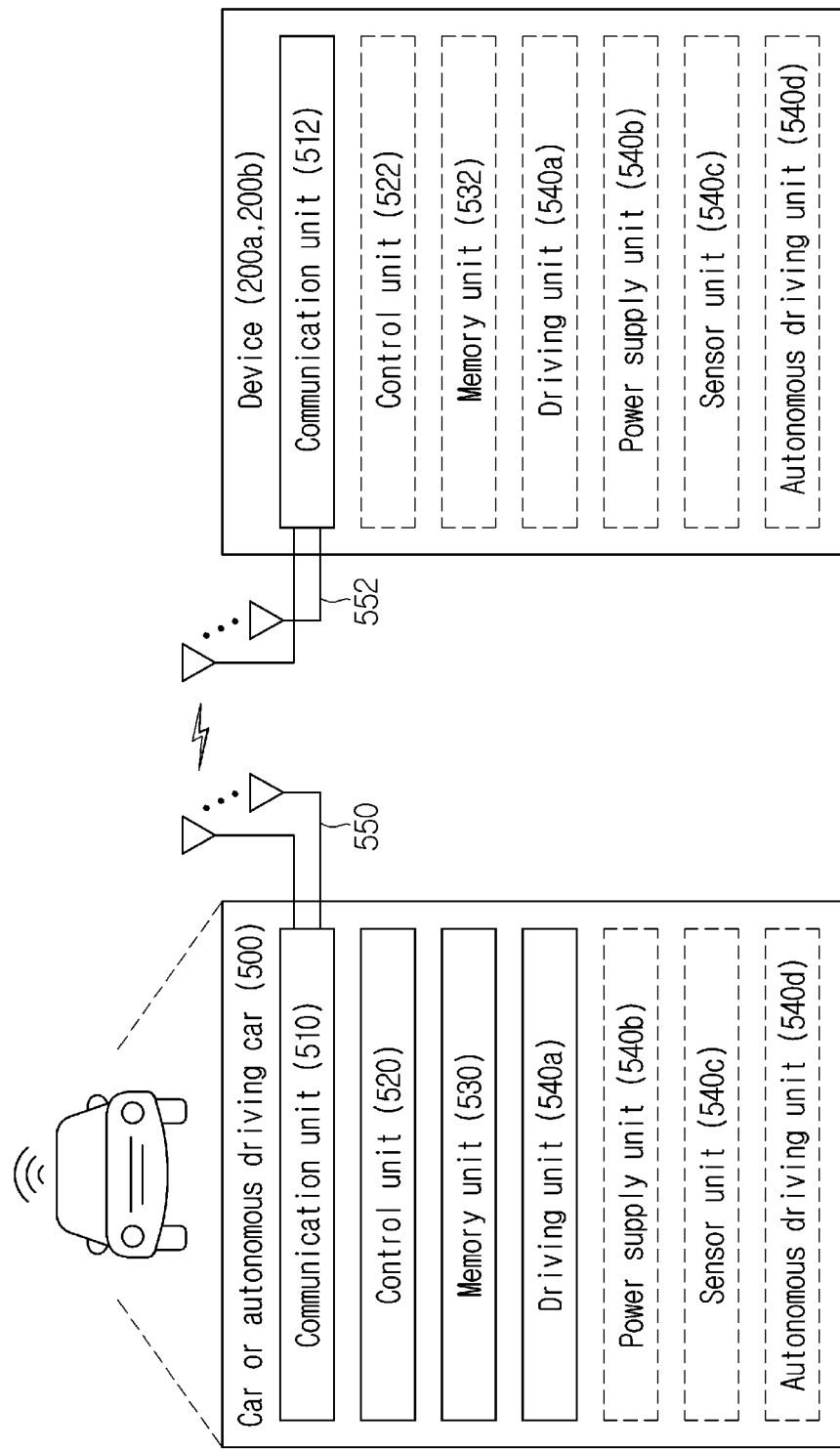
FIG. 21 illustrates an example of a vehicle or an autonomous vehicle according to an embodiment of the present disclosure.

FIG. 21 illustrates an example of a vehicle or an autonomous vehicle according to an embodiment of the present disclosure. FIG. 21 illustrates a vehicle or autonomous vehicle that is applied to the present disclosure. The vehicle or autonomous vehicle may be implemented by a mobile robot, a car, a train, a manned/unmanned aerial vehicle (AV), a ship and the like but is not limited to a vehicle form. An embodiment of FIG. 21 may be combined with various embodiments of the present disclosure.

Referring to FIG. 21, a vehicle or autonomous vehicle 600 may include an antenna unit 608, a communication unit 610, a control unit 620, a driving unit 640a, a power supply unit 640b, a sensor unit 640c, and an autonomous driving unit 640d. The antenna unit 650 may be configured as a part of the communication unit 610. Blocks 610/630/640a to 640d correspond to blocks 510/530/540 of FIG. 21 respectively, and a redundant description will be skipped.

The communication unit 610 may transmit and receive signals (e.g., data and control signals) to and from external devices such as other vehicles, base stations (e.g., base stations and road side units), and servers. The control unit 620 may perform various operations by controlling elements of the vehicle or the autonomous vehicle 100. The control unit 120 may include an electronic control unit (ECU). The driving unit 640a may cause the vehicle or autonomous vehicle 600 to drive on a road. The driving unit 640a may include an engine, a motor, a powertrain, a wheel, a brake, a steering device, etc. The power supply unit 640b may supply power to the vehicle or autonomous vehicle 600 and include a wired/wireless charging circuit, a battery, etc. The sensor unit 640c may acquire a vehicle state, ambient environment information, user information, etc. The sensor unit 640c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 640d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 610 may receive map data, traffic information data, etc., from an external server. The autonomous driving unit 640d may generate an autonomous driving path and a driving plan from the obtained data. The control unit 620 may control the driving unit 640a such that the vehicle or autonomous vehicle 600 may move along the autonomous driving path according to the driving plan (e.g., speed/direction control). In the middle of autonomous driving, the communication unit 610 may aperiodically/periodically acquire recent traffic information data from the external server and acquire surrounding traffic information data from neighboring vehicles. In the middle of autonomous driving, the sensor unit 640c may obtain a vehicle state and/or surrounding environment information. The autonomous driving unit 640d may update the autonomous driving path and the driving plan based on the newly obtained data/information. The communication unit 610 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered illustrative. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

INDUSTRIAL APPLICABILITY

Embodiments of the present disclosure are applicable to various wireless access systems. As examples of the various wireless access systems, there are 3rd Generation Partnership Project (2GPP), 3GPP2 and the like.

Embodiments of the present disclosure are applicable not only to the various wireless access systems but also to all technical fields utilizing the various wireless access systems. Furthermore, the proposed method may be applied to mmWave and THz Wave communication systems using very high frequency.

Additionally, embodiments of the present disclosure may be applied to various applications like autonomous cars and drones.

What is claimed is:

1. A method of operating a first terminal in a wireless communication system, the method comprising:
    transmitting a sidelink synchronization signal (SLSS) to a second terminal, wherein the SLSS includes a primary sidelink synchronization signal (PSSS) and a secondary sidelink synchronization signal (SSSS);
    transmitting control information through a physical sidelink control channel (PSCCH);
    transmitting a data through a physical sidelink shared channel (PSSCH), wherein the data includes a scheduling request message related to beam to the second terminal, wherein the scheduling request message related to beam includes transmission beam direction information of the first terminal and scheduling information related to receiving beam of the first terminal, and wherein the scheduling information related to receiving beam of the first terminal includes at least one of receiving signal timing information related to receiving beam of the first terminal or receiving resource pool information of the first terminal;
    receiving a scheduling confirm message related to beam from the second terminal, wherein the scheduling confirm message related to beam includes transmission beam direction information of the second terminal and scheduling information related to receiving beam of the second terminal, and wherein the receiving beam information of the second terminal includes at least one of receiving signal timing information related to receiving beam of the second terminal or receiving resource pool information of the second terminal; and
    transmitting, by the first terminal, data to the second terminal based on the scheduling confirm message related to beam.

2. The method of claim 1, wherein the receiving signal timing information related to receiving beam of the second terminal is different from the receiving signal timing information related to receiving beam of the first terminal.

3. The method of claim 2, wherein the receiving resource pool information of the second terminal is different from the receiving resource pool information of the first terminal.

4. The method of claim 1, wherein the transmitting of the data to the second terminal comprises:
    transmitting a transmission request message to the second terminal;
    receiving a transmission confirm message from the second terminal; and
    transmitting data based on the received transmission confirm message,
    wherein the transmission request message includes at least one of receiving slot information of the transmission confirm message, receiving subchannel information of the transmission confirm message, a transmission data size, or per-subchannel RSRP measurement value information of an aligned beam.

5. The method of claim 4, wherein the transmission confirm message includes transmission resource pool information.

6. The method of claim 4, wherein the scheduling request message related to beam and the scheduling confirm message related to beam include lane information, and
    wherein the transmission request message and the transmission confirm message include lane information.

7. The method of claim 6, wherein the first terminal is a leader node of a first platoon group, and
    wherein the first terminal transmits a resource reconfiguration request message to nodes in the first platoon group based on the lane information and the beam direction information.

8. A first terminal in a wireless communication system, comprising:
    a transceiver; and
    a processor coupled with the transceiver,
    wherein the processor is configured to control the transceiver to:
    transmit a sidelink synchronization signal (SLSS) to a second terminal, wherein the SLSS includes a primary sidelink synchronization signal (PSSS) and a secondary sidelink synchronization signal (SSSS);
    transmit control information through a physical sidelink control channel (PSCCH);
    transmit a data through a physical sidelink shared channel (PSSCH), wherein the data includes a scheduling request message related to beam to the second terminal, wherein the scheduling request message related to beam includes transmission beam direction information of the first terminal and scheduling information related to receiving beam of the first terminal, and the information related to receiving beam of the first terminal includes at least one of receiving signal timing information related to receiving beam of the first terminal or receiving resource pool information of the first terminal,
    receive a scheduling confirm message related to beam from the second terminal, wherein the scheduling confirm message related to beam includes transmission beam direction information of the second terminal and scheduling information related to receiving beam of the second terminal, and the receiving beam information of the second terminal includes at least one of receiving signal timing information related to receiving beam of the second terminal or receiving resource pool information of the second terminal, and
    transmit data to the second terminal based on the scheduling confirm message related to beam.

9. The first terminal of claim 8, wherein the receiving signal timing information related to receiving beam of the second terminal is different from the receiving signal timing information related to receiving beam of the first terminal.

10. The first terminal of claim 8, wherein the receiving resource pool information of the second terminal is different from the receiving resource pool information of the first terminal.

11. The first terminal of claim 8, wherein the transmitting of the data to the second terminal is transmitting a transmission request message to the second terminal,
    wherein the transceiver is configured to receive a transmission confirm message from the second terminal and to transmit data based on the received transmission confirm message, and
    wherein the transmission request message includes at least one of receiving slot information of the transmission confirm message, receiving subchannel information of the transmission confirm message, a transmission data size, or per-subchannel RSRP measurement value information of an aligned beam.

12. The first terminal of claim 11, wherein the transmission confirm message includes transmission resource pool information.

13. The first terminal of claim 11, wherein the scheduling request message related to beam and the scheduling confirm message related to beam include lane information, and
wherein the transmission request message and the transmission confirm message include lane information.

14. The first terminal of claim 13, wherein the first terminal is a leader node of a platoon group, and
wherein the processor is further configured to control the transceiver to transmit a resource reconfiguration request message to nodes in the platoon group based on the lane information and the beam direction information.

15. A method of operating a second terminal in a wireless communication system, the method comprising:
receiving a scheduling request message related to beam from a first terminal, wherein the scheduling request message related to beam includes transmission beam direction information of the first terminal and scheduling information related to receiving beam of the first terminal, and the scheduling information related to receiving beam of the first terminal includes at least one of receiving signal timing information related to receiving beam of the first terminal or receiving resource pool information of the first terminal;
transmitting a scheduling confirm message related to beam to the first terminal, wherein the scheduling confirm message related to beam includes transmission beam direction information of the second terminal and scheduling information related to receiving beam of the second terminal, and the receiving beam information of the second terminal includes at least one of receiving signal timing information related to receiving beam of the second terminal or receiving resource pool information of the second terminal; and
receiving, by the second terminal, data from the first terminal based on the scheduling confirm message related to beam.

16. A second terminal in a wireless communication system, comprising:
a transceiver; and
a processor coupled with the transceiver,
wherein the processor is configured to control the transceiver to:
receive a scheduling request message related to beam from a first terminal, wherein the scheduling request message related to beam includes transmission beam direction information of the first terminal and scheduling information related to receiving beam of the first terminal, and the scheduling information related to receiving beam of the first terminal includes at least one of receiving signal timing information related to receiving beam of the first terminal or receiving resource pool information of the first terminal,
transmit a scheduling confirm message related to beam to the first terminal, wherein the scheduling confirm message related to beam includes transmission beam direction information of the second terminal and scheduling information related to receiving beam of the second terminal, and the receiving beam information of the second terminal includes at least one of receiving signal timing information related to receiving beam of the second terminal or receiving resource pool information of the second terminal, and
receive data from the first terminal based on the scheduling confirm message related to beam.

17. A first device comprising:
at least one memory; and
at least one processor functionally coupled with the at least one memory,
wherein the at least one processor is configured to control the first device to:
transmit a scheduling request message related to beam to a second device, wherein the scheduling request message related to beam includes transmission beam direction information of the first device and scheduling information related to receiving beam of the first device, and wherein the scheduling information related to receiving beam of the first device includes at least one of receiving signal timing information related to receiving beam of the first device or receiving resource pool information of the first device,
receive a scheduling confirm message related to beam from the second device, wherein the scheduling confirm message related to beam includes transmission beam direction information of the second device and scheduling information related to receiving beam of the second device, and the receiving beam information of the second device includes at least one of receiving signal timing information related to receiving beam of the second device or receiving resource pool information of the second device, and
transmit data to the second device based on the scheduling confirm message related to beam.

18. A non-transitory computer-readable medium storing at least one instruction, comprising the at least one instruction that is executable by a processor,
wherein the at least one instruction instructs the computer-readable medium to:
transmit a scheduling request message related to beam to a terminal, wherein the scheduling request message related to beam includes transmission beam direction information of the computer-readable medium and scheduling information related to receiving beam of the computer-readable medium, and the scheduling information related to receiving beam of the computer-readable medium includes at least one of receiving signal timing information related to receiving beam of the computer-readable medium or receiving resource pool information of the computer-readable medium,
receive a scheduling confirm message related to beam, wherein the scheduling confirm message related to beam includes transmission beam direction information of the terminal and scheduling information related to receiving beam of the terminal, and the receiving beam information of the terminal includes at least one of receiving signal timing information related to receiving beam of the terminal or receiving resource pool information of the terminal, and
transmit data to the terminal based on the scheduling confirm message related to beam.

* * * * *